US006222152B1

(12) United States Patent
Nomura et al.

(10) Patent No.: US 6,222,152 B1
(45) Date of Patent: Apr. 24, 2001

(54) ELECTRIC HEATING TREATMENT METHOD, ELECTRIC HEATING TREATMENT APPARATUS, AND ELECTRODE FOR ELECTRIC HEATING TREATMENT APPARATUS

(75) Inventors: Seiji Nomura, Kure; Yukihiro Sugimoto, Higashihiroshima, both of (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/227,193

(22) Filed: Jan. 8, 1999

(30) Foreign Application Priority Data

Jan. 12, 1998 (JP) .......... 10-018142
Sep. 30, 1998 (JP) .......... 10-294543

(51) Int. Cl.[7] .......... B23K 11/16

(52) U.S. Cl. .......... 219/118; 219/117.1; 219/78.01; 219/91.2; 219/91.23

(58) Field of Search .......... 219/118, 117.1, 219/78.01, 91.2, 91.23, 119, 156, 158, 50, 86.1, 121.16; 148/566, 688; 228/228, 230

(56) References Cited

U.S. PATENT DOCUMENTS 1,533,236 4/1925 Dawson .
3,596,047 * 7/1971 Maniero .......... 219/123
3,854,029 * 12/1974 Fenollar .......... 219/149
4,633,054 * 12/1986 Patrick et al. .......... 219/118
4,650,951 * 3/1987 Koga et al. .......... 219/118
4,924,057 * 5/1990 Puddle et al. .......... 219/118
5,073,693 * 12/1991 Kikuchi et al. .......... 219/93
5,731,567 * 3/1998 Kato et al. .......... 219/137 R

FOREIGN PATENT DOCUMENTS 2203 574 8/1973 (DE) .
41 24 644 A1 1/1993 (DE) .
607808 9/1948 (GB) .
874423 8/1961 (GB) .
64-56817 3/1989 (JP) .
5-156346 6/1993 (JP) .
6-172846 6/1994 (JP) .

* cited by examiner

*Primary Examiner*—Patrick Ryan
*Assistant Examiner*—M. Alexandra Elve
(74) *Attorney, Agent, or Firm*—Nixon Peabody LLP; Donald R. Studebaker

(57) ABSTRACT

Quality localized surface treatment such as remelting a surface portion of a work by electric heating can be achieved easily by supplying electric current between an energization electrode and the work while holding the distal end portion of the energization electrode nearly in close contact with the surface portion. Localized heating can be successfully accomplished by electric heating based on the heat generated from the self resistance of the energization electrode itself and the heat generated from the contact resistance at the interface between the distal end portion of the energization electrode and the surface portion.

17 Claims, 23 Drawing Sheets

ELECTRIC HEATING TREATMENT METHOD, ELECTRIC HEATING TREATMENT APPARATUS, AND ELECTRODE FOR ELECTRIC HEATING TREATMENT APPARATUS

BACKGROUND OF THE INVENTION

1. Field of the Invention

The present invention relates to an electric heating treatment method, an electric heating treatment apparatus, and an electrode for the electric heating treatment apparatus, and more particularly, to an electric heating treatment method and an electric heating treatment apparatus for treating the surfaces of works by electrically heating the works.

2. Description of the Related Art

In general, the surfaces of the inter-valve sections of a cylinder head formed of aluminum alloy casting in a diesel engine, for example, are provided with remelting treatment to make them resistant to high thermal stress. Conventionally, the remelting treatment is carried out by applying high-density energy using a TIG arc, plasma arc, laser beam, electron beam, etc. For instance, in the case of the remelting treatment using an arc, as schematically shown in the sectional view of FIG. 35, a high temperature arc 42 is radiated from a torch 41 placed away by a predetermined distance from the surface of a work 40 to melt the surface of the work 40 by the heat transmitted from the arc 42. Then, the torch 41 is continuously moved along a portion requiring the remelting treatment. At this time, right beneath the arc 42, a new crater 45 is created by the arc 42, and the portion melted by the arc 42 flows to a portion that has been a crater 45*a* before the torch 41 was moved so as to fill the crater 45*a*; the portion is rapidly self-cooled due to the withdrawal of heat to a base material and it solidifies. As a result, the structure of the surface portion of the work 40 is turned into a continuous finer structure as the torch 41 is moved so as to produce a reinforced layer 46. A shielding gas 43 of argon, helium, or other gas is simultaneously sprayed from the torch 41 at around the arc 42 to prevent the melted portion from being oxidized due to contact with air.

It has been proposed to evenly heat a whole cam shaft by abutting electrodes against both ends of the cam shaft to perform preheating prior to the remelting treatment of the cam shaft as disclosed in, for example, Japanese Patent Publication No. 5-156346.

As disclosed in, for example, Japanese Patent Publication No. 6-172846, it has been known that a metal strip moved in a continuous heat treatment furnace is electrically heated by carbon roll electrodes to anneal it.

Further, it has been proposed in, for example, Japanese Patent Publication No. 64-56817, to abut an electrode against a part of a work and to form a bypass electric path for detouring a hot portion or the abutted portion of the work. Thus, when the portion other than the hot portion of the work reaches approximately the same temperature as the hot portion, the bypass electric path is released to electrically heat the whole work.

Furthermore, it has been known to electrically heat a metal strip moved in a continuous heat treatment furnace by carbon roll electrodes to anneal it as disclosed in, for example, Japanese Patent Publication No. 6-172846.

SUMMARY OF THE INVENTION

The prior art described above, however, have the following shortcoming. When the remelting treatment is performed by the arc 42, the crater 45 is produced by the arc 42; therefore, in order to prevent the crater 45 from being left at the end of the treatment in the portion requiring the remelting treatment, it is necessary to continuously move the torch 41 even to a portion that does not require the treatment. For this reason, the prior art present such disadvantages as difficulties in successfully remelting just a particular spot only, much time required for the treatment, and possibilities of cracks attributable to undue thermal stress developed in the vicinity of a portion under the treatment. Further, a phenomenon known as a magnetic arc blow disturbs the arc, causing displacement from time to time. Furthermore, there is a danger of the treatment not being performed because of an ignition failure. The heat withdrawal to a base material causes directive solidification from the base material to the surface of a work to perform degassing; however, the heat is withdrawn also to the surface as the torch 41 is moved, undesirably resulting in insufficient directive solidification. Still another disadvantage is the need for the shielding gas 43 to prevent the surface from being oxidized.

Using the laser beams or the like to remelt a work formed of an aluminum constituent, which is highly reflective, presents a problem of poor efficiency. This makes it difficult to achieve deep remelting treatment of a portion requiring the treatment. Concentrating energy also causes craters as in the case of the treatment carried out by arcs.

As possible solutions, there have been available the surface treatment processes implemented by electric heating as in the prior art described above. However, in the cases of the treatments disclosed in Japanese Patent Publication No. 5-156346 and No. 64-56817, the high heat conductivity of the aluminum constituent makes it difficult to successfully achieve localized rapid heating although it makes it possible uniformly heat the whole work. In the case of the treatment described in Japanese Patent Publication No. 6-172846, since the metal strip is continuously moved with respective to the carbon roll electrodes, the heat is withdrawn also to the surface of the work. Thus, all of the prior art make it difficult to protect the work surfaces from oxidization or to permit satisfactory directive solidification in the remelting treatment.

Accordingly, the present invention has been made with a view toward solving the problems described above, and it is an object thereof to make it possible to achieve quality localized treatment by an easy method by improving the conventional electric heating treatment methods to perform surface treatment such as remelting on the surface of a work.

To this end, according to the present invention, there is provided a method and an apparatus for electric heating treatment for carrying out predetermined heating surface treatment on a surface portion of a work, wherein electric current is supplied between an energization electrode and a work while maintaining a distal end of the energization electrode nearly in close contact with the surface portion to effect localized heating by electric heating that makes use of the heat generation from the self resistance of the energization electrode itself and the heat generation from the contact resistance at the interface between the distal end of the energization electrode and the surface portion, thereby providing the surface portion with the predetermined surface treatment.

Thus, the heat generated from the self resistance of the electrode itself and from the contact resistance at the interface between the electrode and the work is concentrated only on the surface portion of the work in contact with the electrode. This allows the surface portion to be locally heated, permitting the surface treatment to be quickly completed before the heat is withdrawn to other portions. Hence, abutting the electrode only against a portion requiring the treatment enables localized treatment to be carried out easily. Since the electrode is held nearly in close contact with the surface portion, the portion is not exposed to air during the treatment; therefore, the surface can be protected against oxidization without the need for using a shielding gas or the like. Moreover, during the remelting treatment, the electrode maintains the heat insulation effect even after the supply of electric current is stopped, so that the heat is hardly withdrawn from the surface, thus enabling the directive solidification to be reliably fulfilled from the base material to the surface of the work. This permits quality surface treatment to be accomplished easily. It is to be understood that the predetermined treatment means the remelting treatment of a work or alloying a work and a material different from the constituent of the work. Thus, an optimum specific treatment can be obtained for the electric heating treatment method.

In a preferred form of the invention, electric current is supplied so that the temperature at the distal end of the electrode is not lower than the melting point of the constituent of the work, thus enabling the remelting treatment or the alloying treatment to be accomplished securely.

In another preferred form of the invention, the work is formed of an aluminum alloy. Since the aluminum alloy has high heat conductivity, the use of an aluminum alloy for the work leads to the problem of the difficulty of localized heating and the problem of the oxidization of the work surface. The present invention, however, permits easy localized heating while preventing the oxidization of the surface; hence, the advantages of the aluminum alloy can be fully displayed.

In a further preferred form of the invention, the electrode is formed of a carbon constituent. The carbon electrode enables the surface treatment to be performed securely and effectively because the carbon constituent exhibits good self heat generation.

In a further preferred form of the invention, the area of a section of the electrode which is approximately parallel to the surface of the work in contact with the electrode is smaller than the distal end portion of the electrode. This makes it possible to maximize the resistance of the electrode to increase the self heat generation while covering the surface area of the work to be treated, enabling satisfactory localized heating.

In still another preferred form of the invention, a surface portion of the work that is to be abutted against the electrode is formed so that it juts out from the surrounding surface before the electric heating treatment. The work is usually pressed against the electrode; hence, the surface portion of the work that is to be abutted against the electrode is dented by the aforesaid pressing, and it can be made flush with the surrounding surface after the treatment, thus allowing the cost of the final finishing process to be reduced. Moreover, if the surface of the work to be abutted against the electrode is smoothed prior to the surface treatment, it is not required to treat the surrounding area thereof in advance, reducing the area to be treated. This permits lower processing cost before and after the surface treatment.

In yet another preferred form of the invention, the electrode and the work are brought nearly into point contact with each other prior to the electric heating, and the area of the contact therebetween is increased by applying pressure to the work by the electrode so as to deform the surface portion of the work in contact with the electrode. This eventually allows the close contact with the electrode to be securely maintained even if the surface portion of the work in contact with the electrode has pits and projections as in a casting surface; therefore, the generation of sparks can be securely prevented without carrying out such preprocessing as smoothing the surface. In addition, uneven distribution of electric current does not take place in the initial stage of the supply of electric current in the electrode, so that proper distribution of thermal stress is possible, thus making it possible to prevent the electrode from cracking.

In a further preferred form of the invention, the electrode is heated in advance before the electric heating treatment. By so doing, the initial energizing temperature of the electrode can be increased. This makes it possible to reduce the thermal stress applied to the electrode during the heating treatment so as to prevent the cracks in the electrode and also to quickly heat the work.

Other features and advantages of the present invention will be apparent from the following description taken in conjunction with the accompanying drawings, in which like reference characters designate the same or similar parts throughout the figures thereof.

Figure 1:
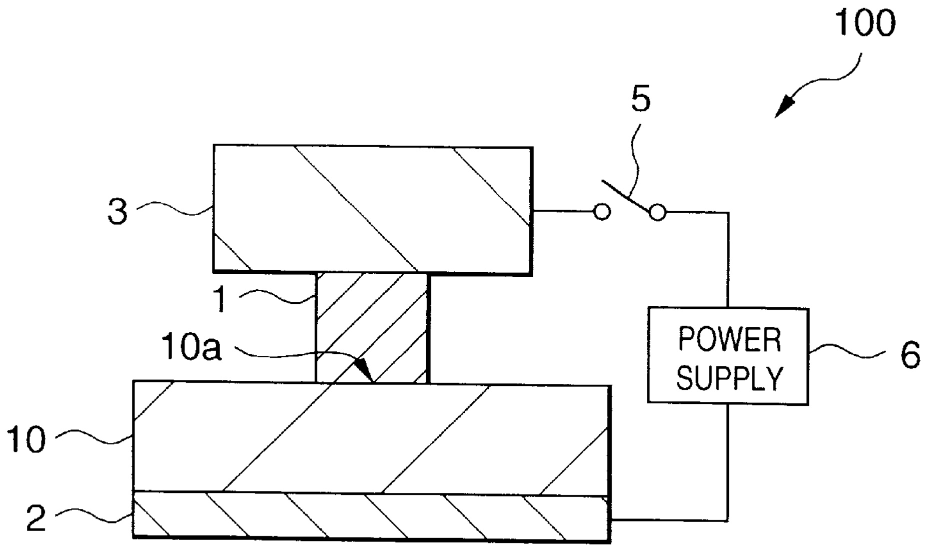
FIG. 1 is a schematic sectional view showing an electric heating treatment apparatus 100 according to an embodiment of the present invention.
Figure 4A:
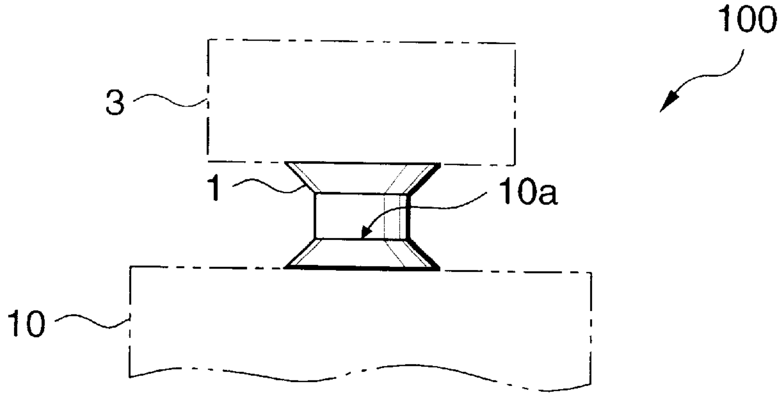
Figure 4B:
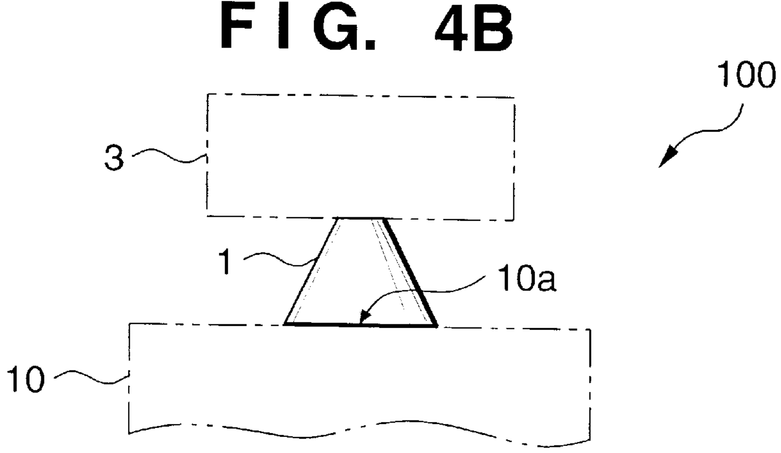
Figure 5:
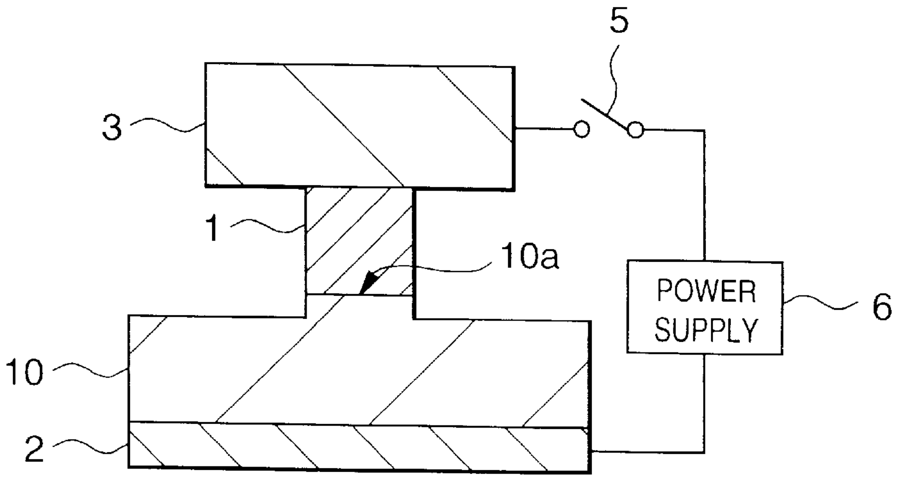
Figure 6A:
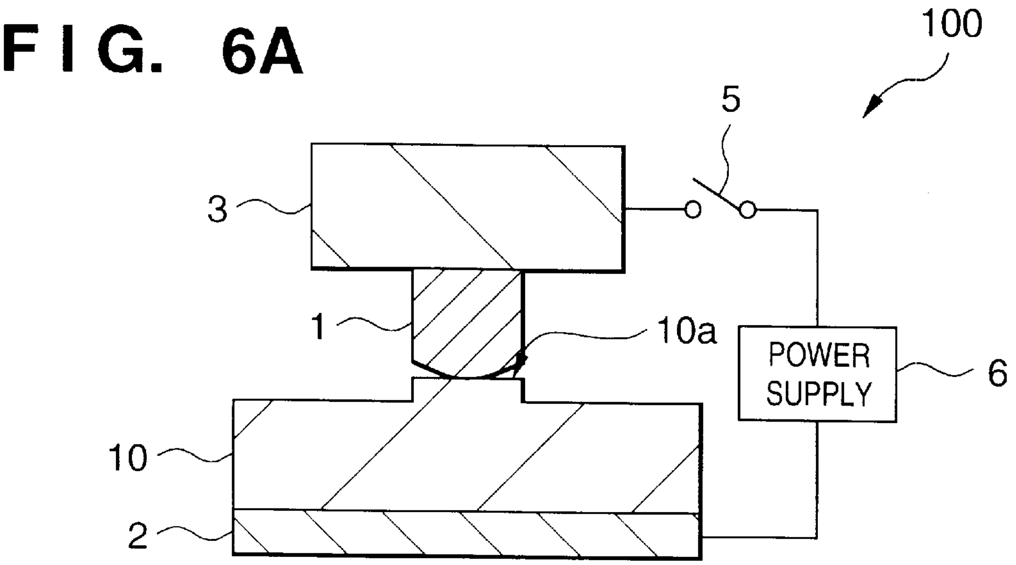
Figure 6B:
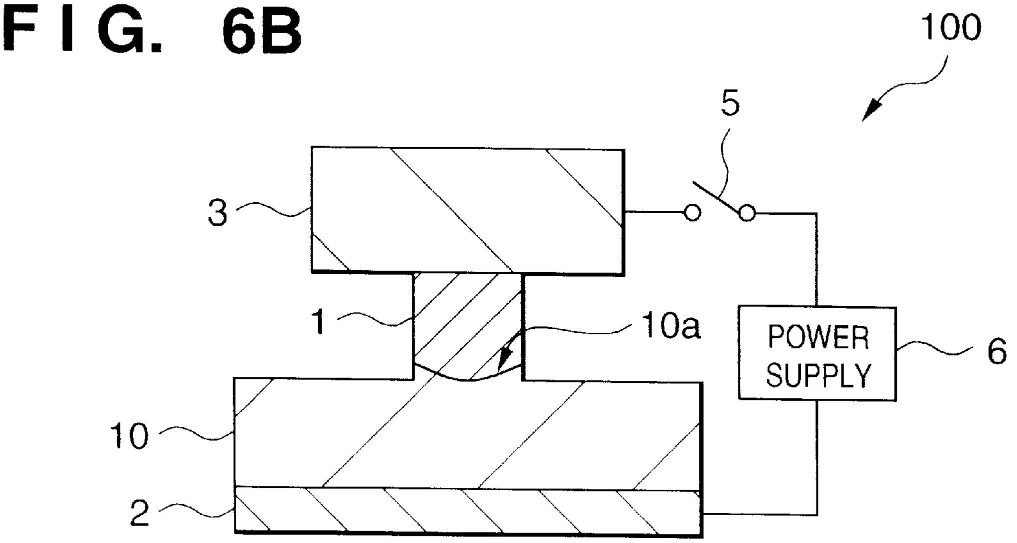
Figure 7:
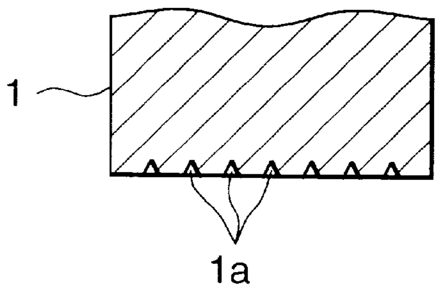
Figure 8:
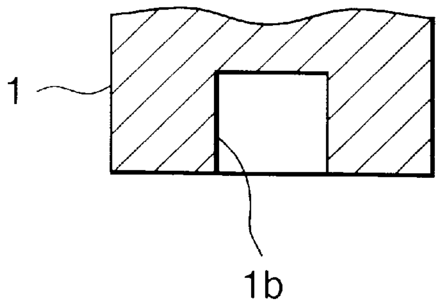
Figure 9:
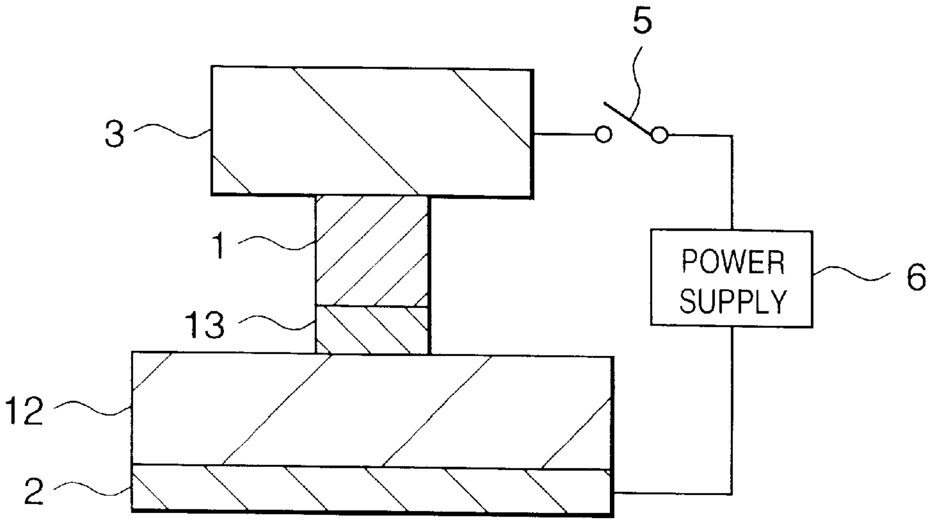
Figure 10:
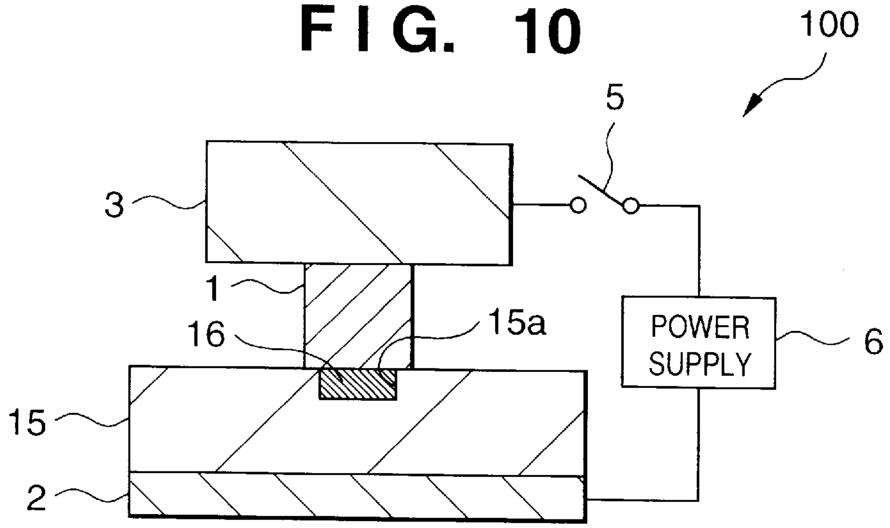
Figure 11:
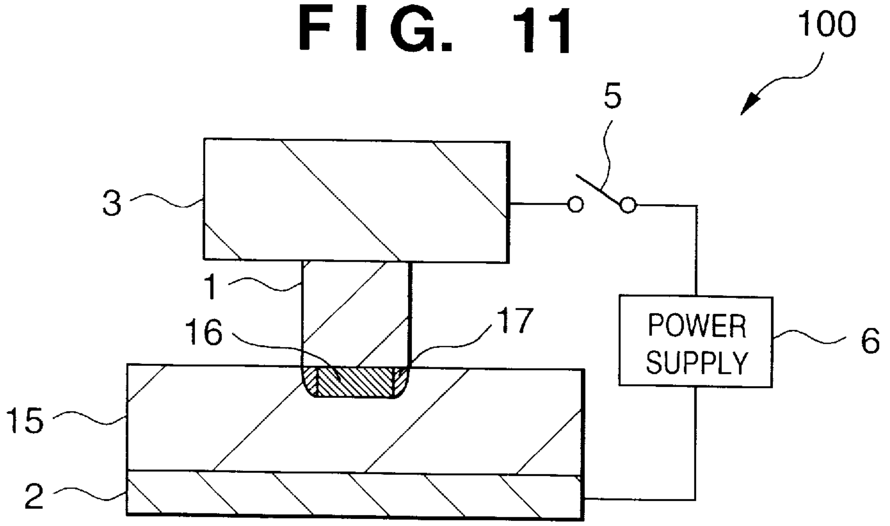
Figure 12:
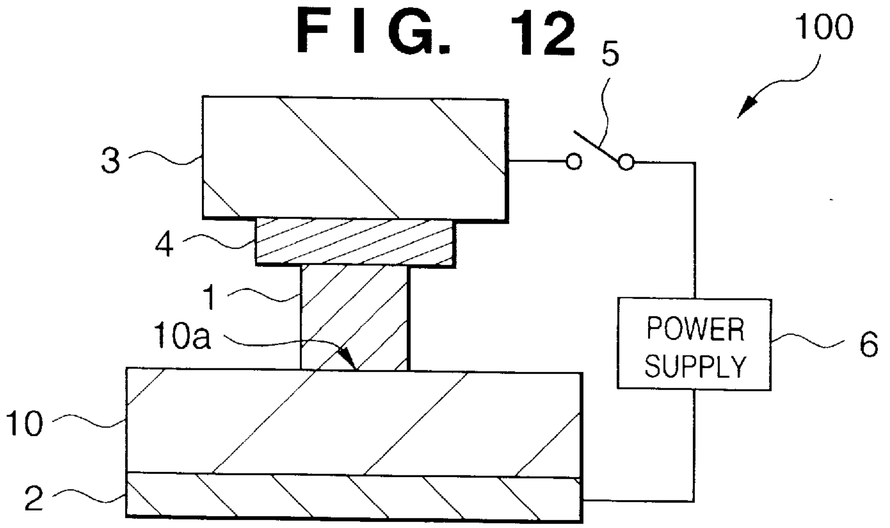
Figure 13:
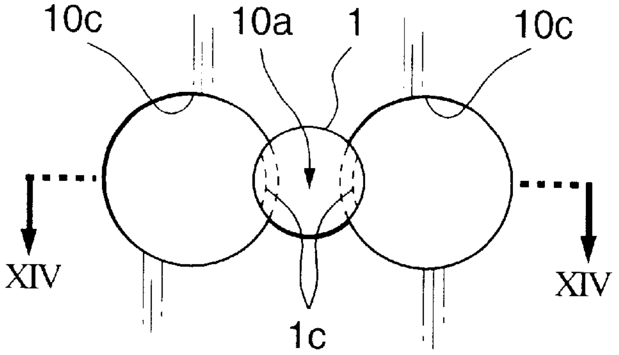
Figure 14:
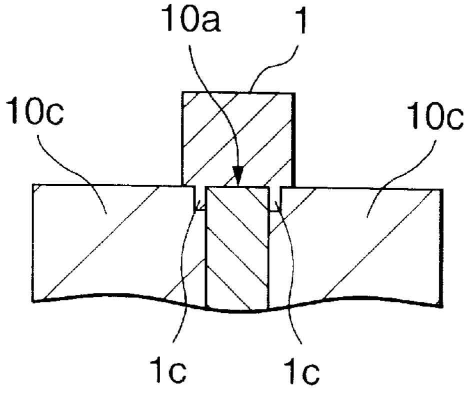
Figure 15:
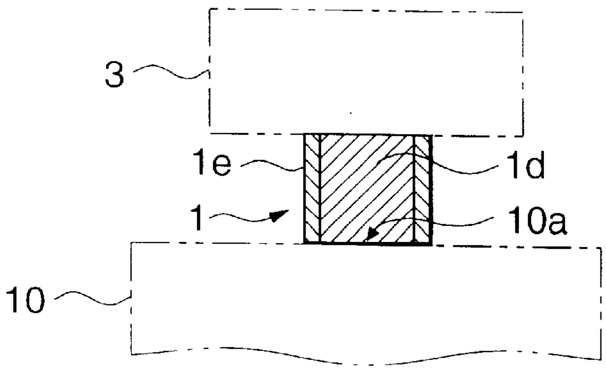
Figure 16:
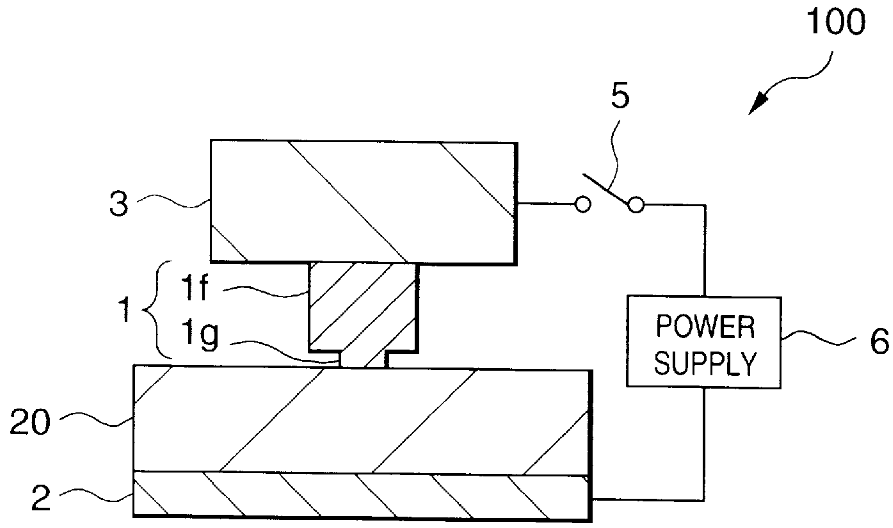
Figure 17:
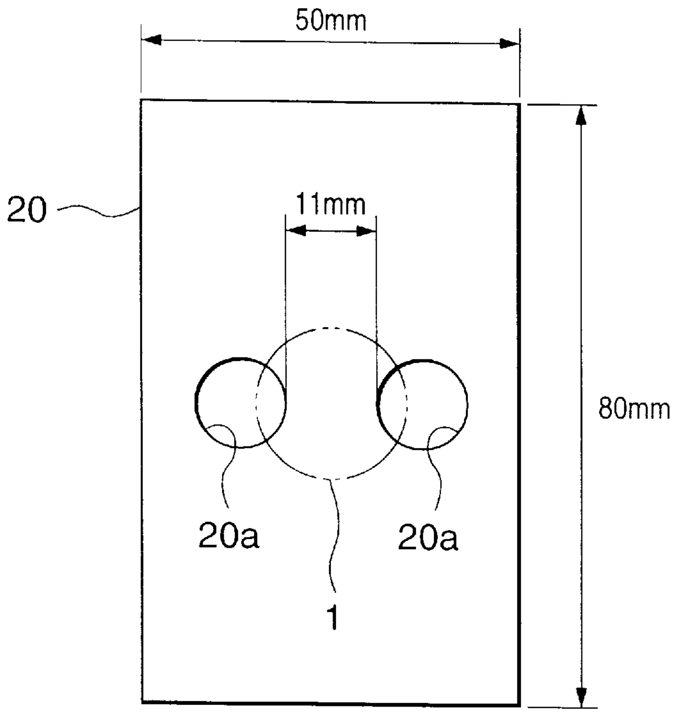
Figure 18:
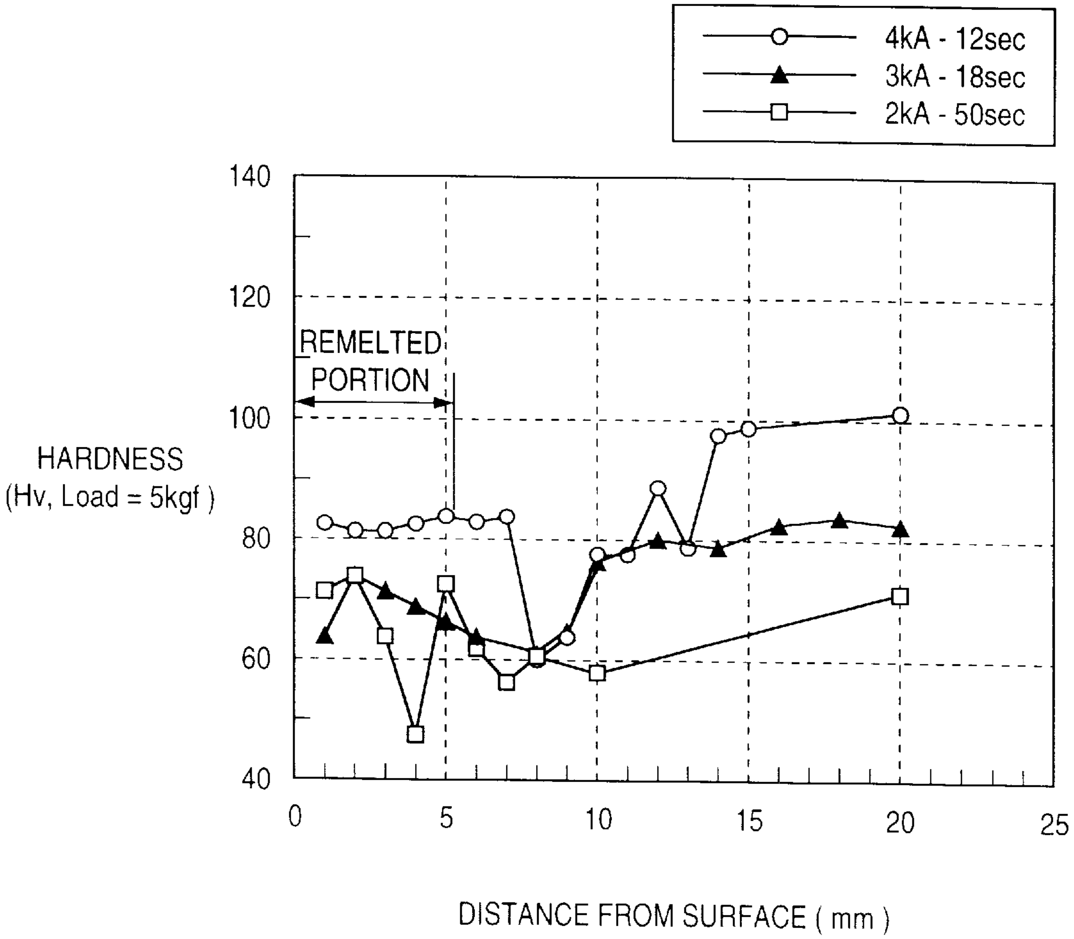
Figure 19:
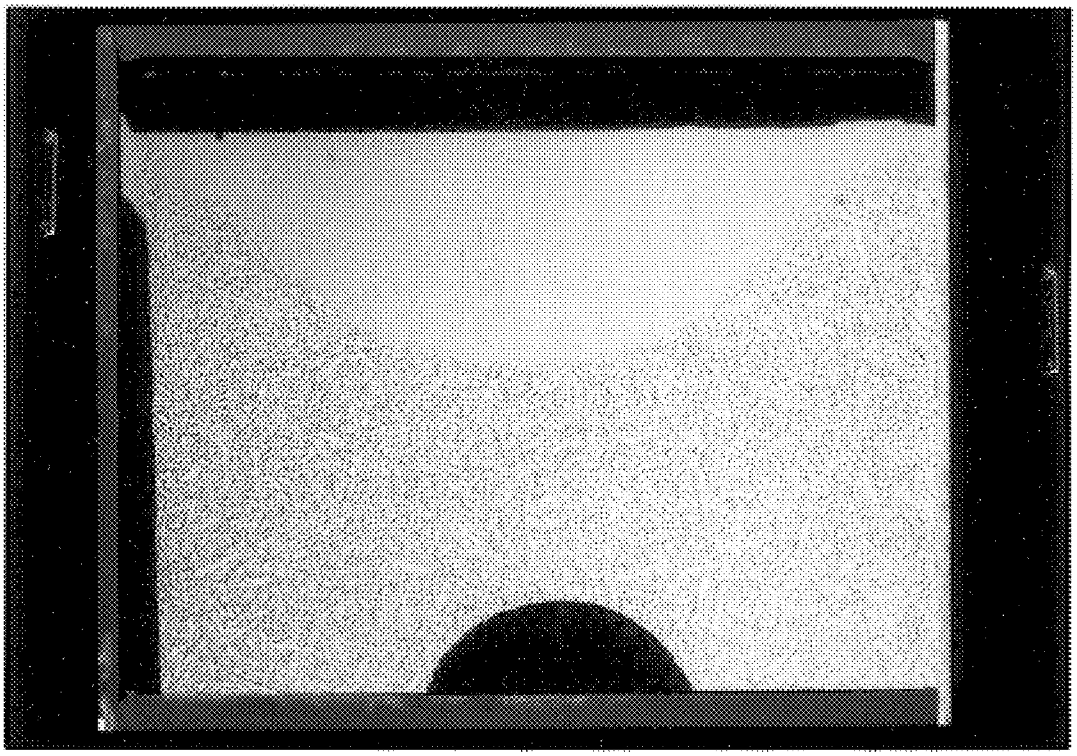
Figure 20:
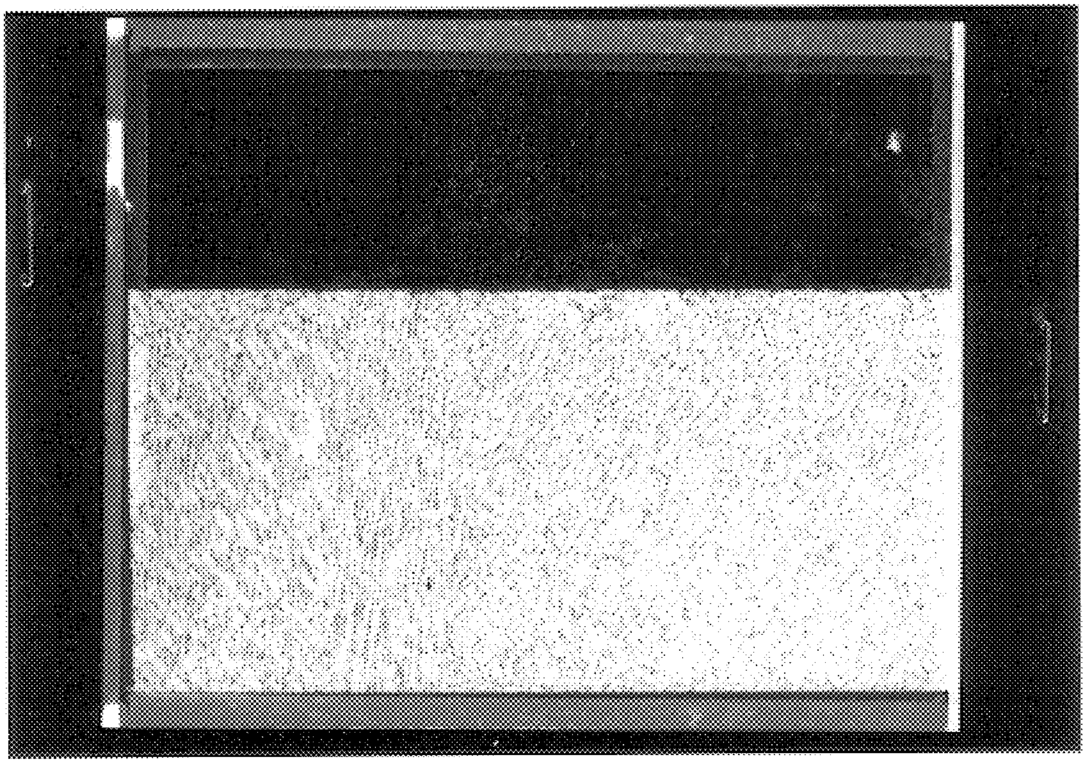
Figure 21:
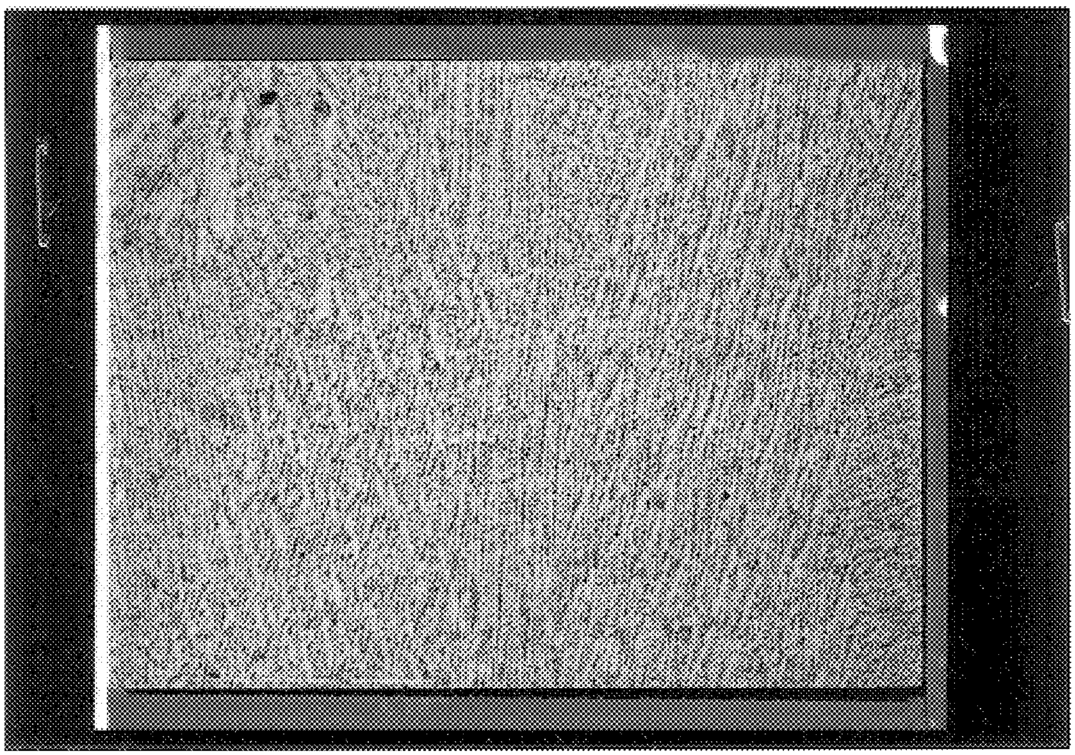
Figure 22:
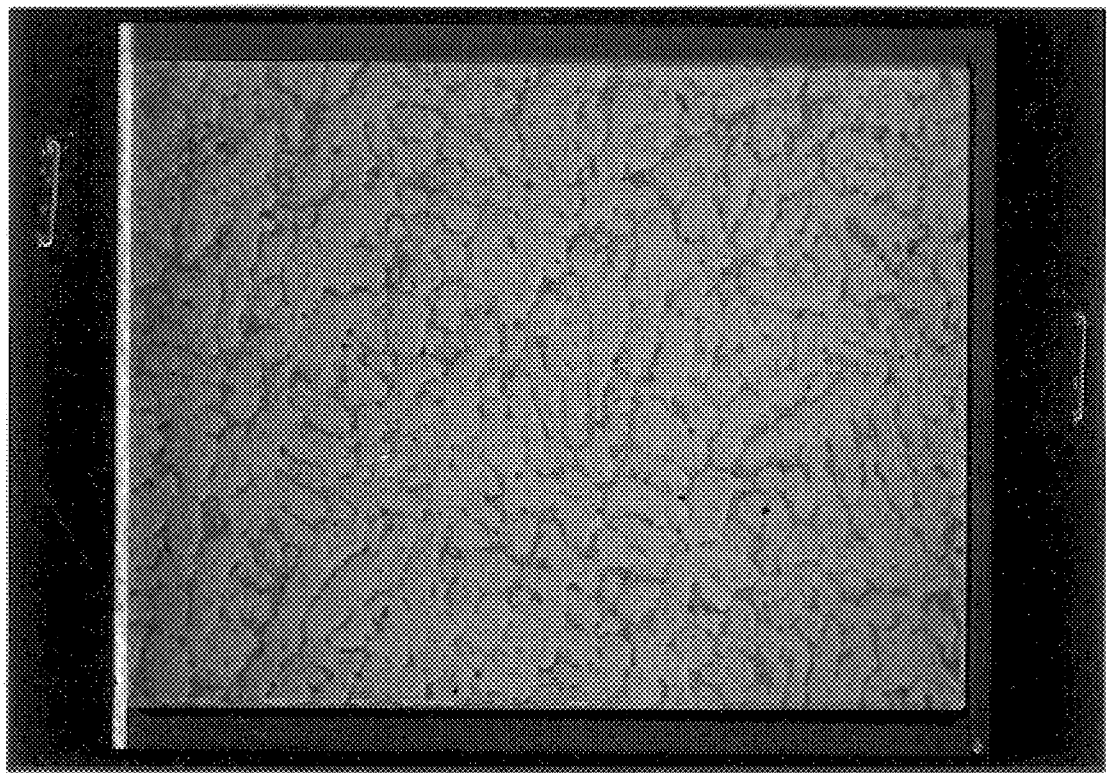
Figure 23:
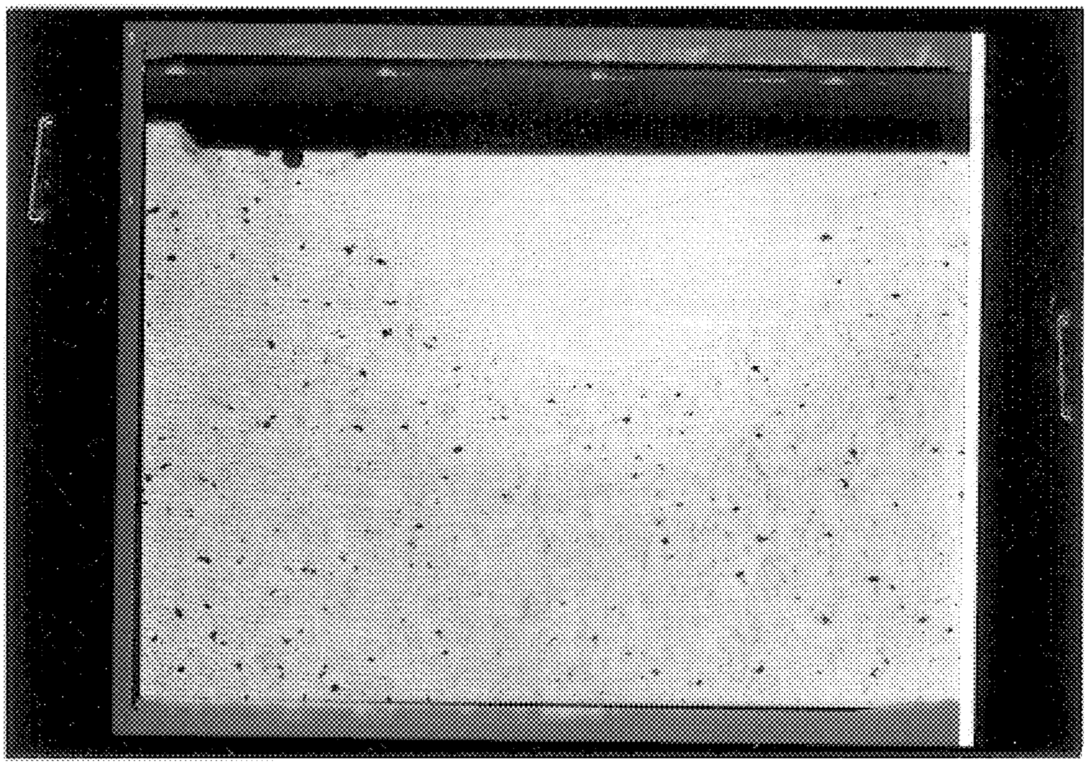
Figure 24:
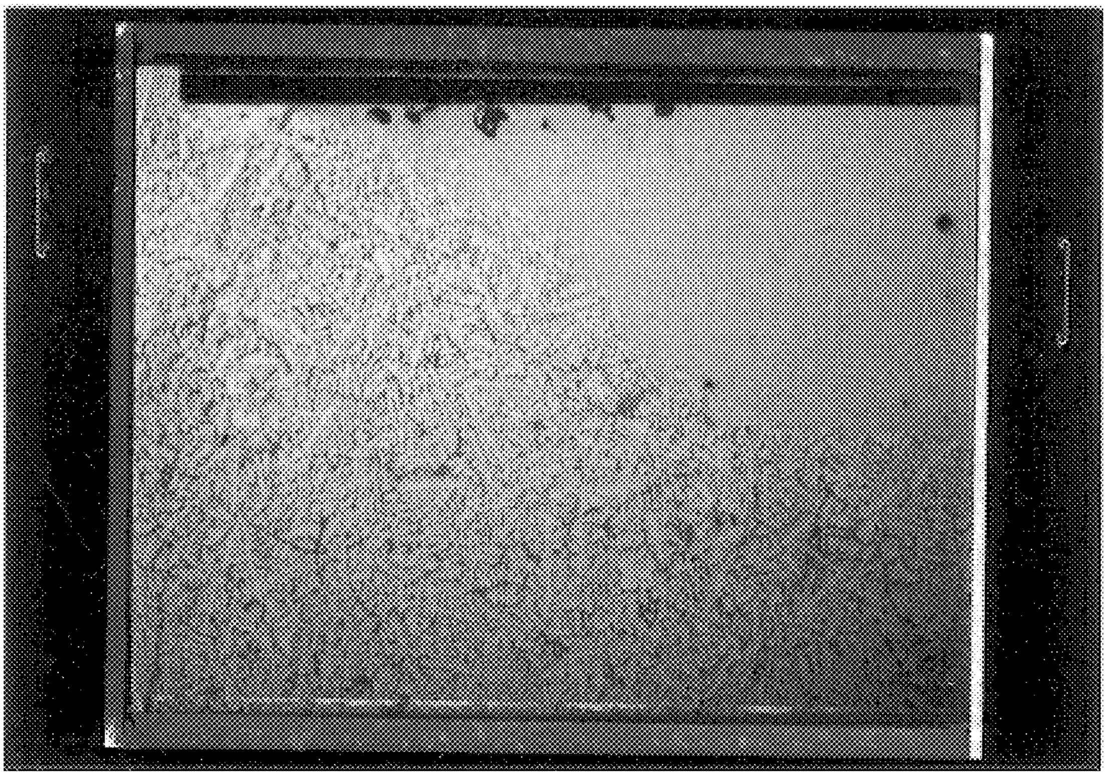
Figure 25:
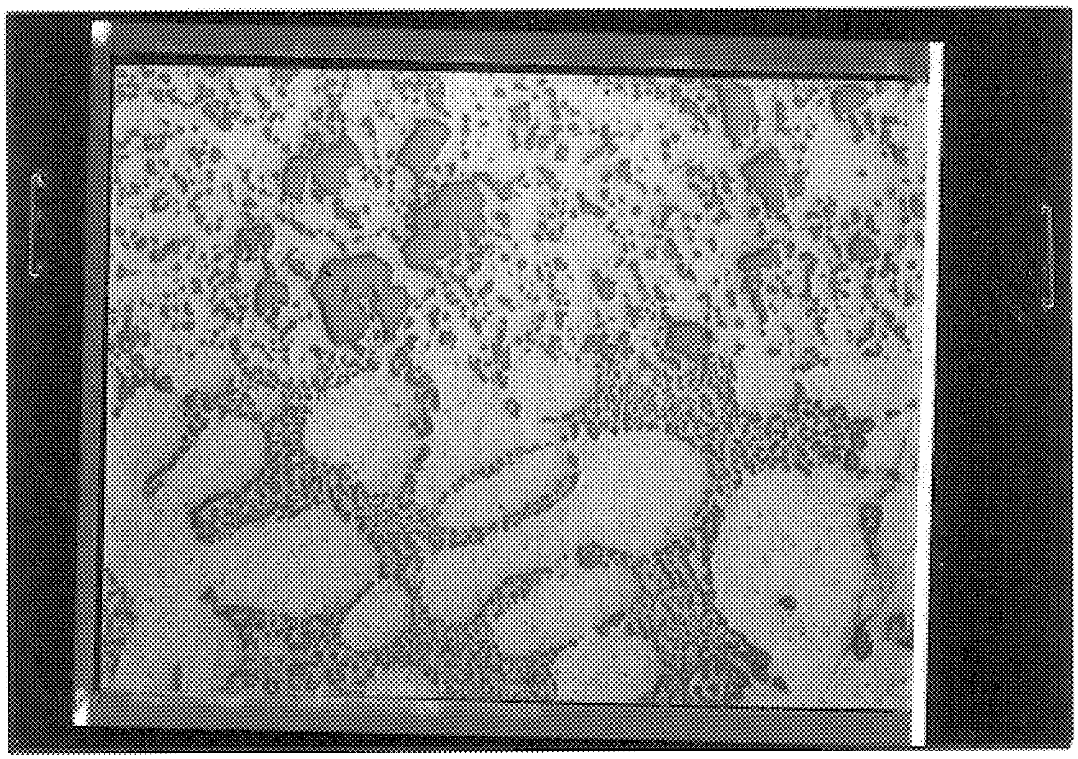
Figure 26:
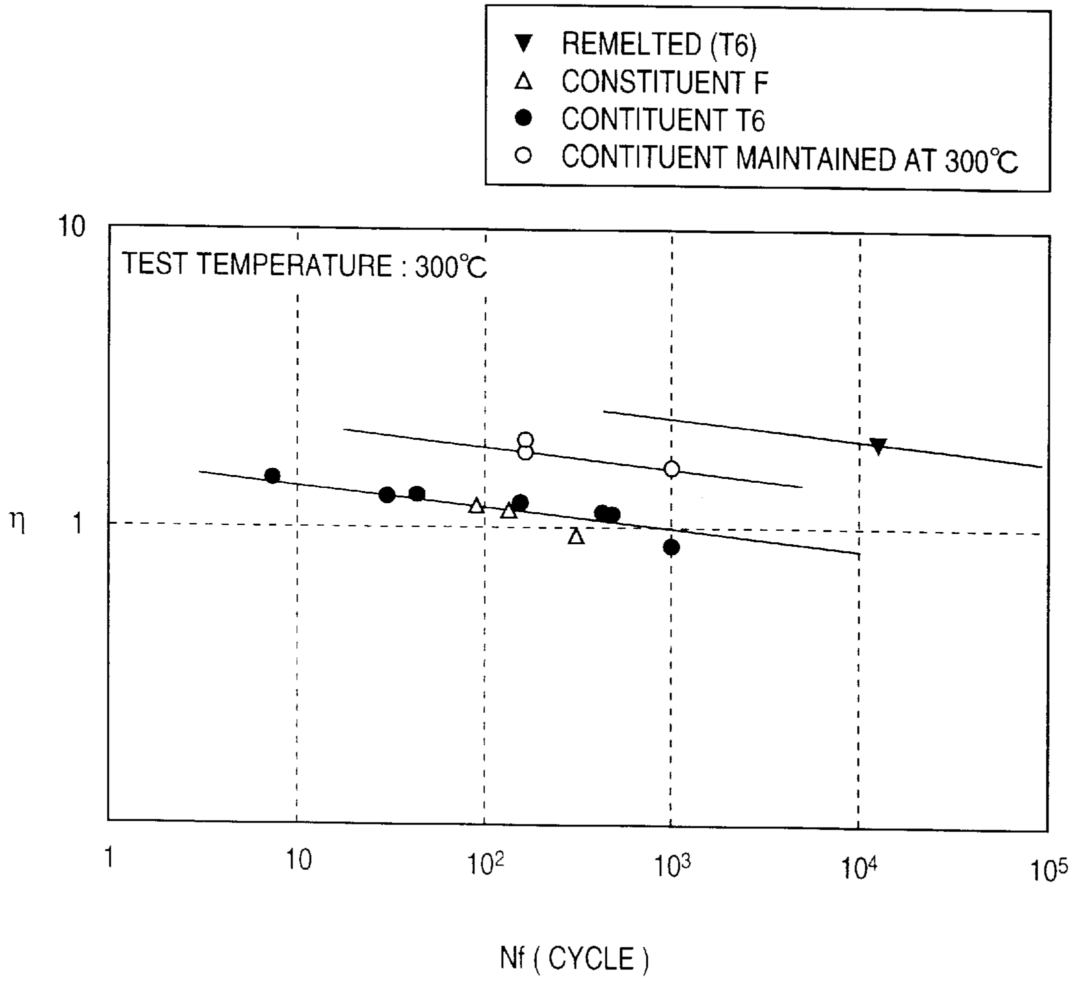
Figure 27:
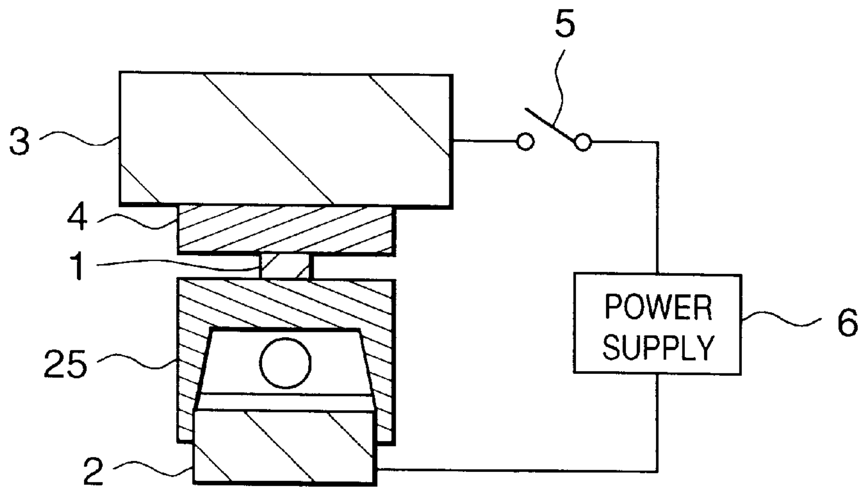
Figure 28:
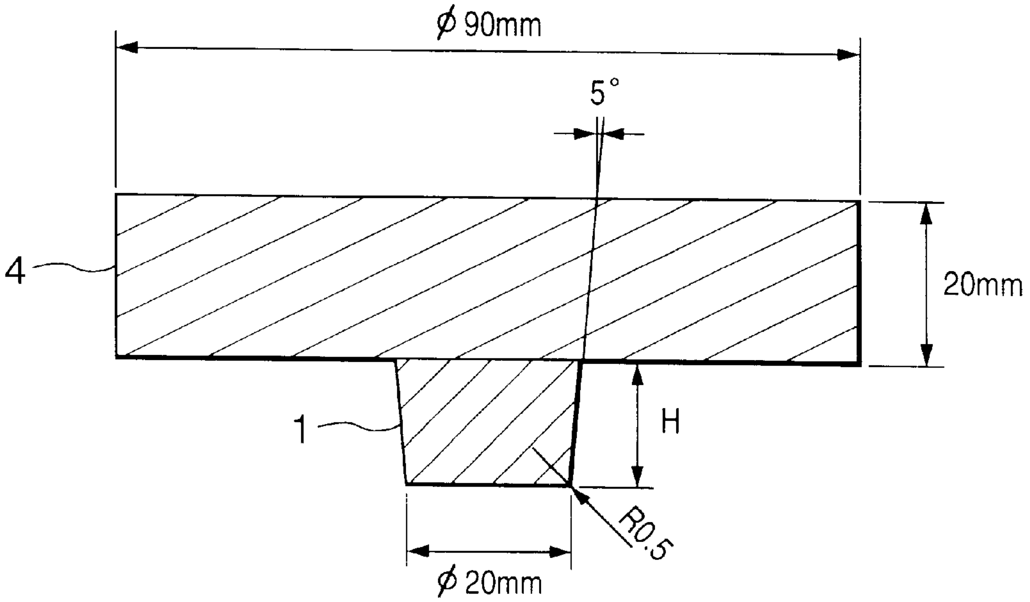
Figure 29:
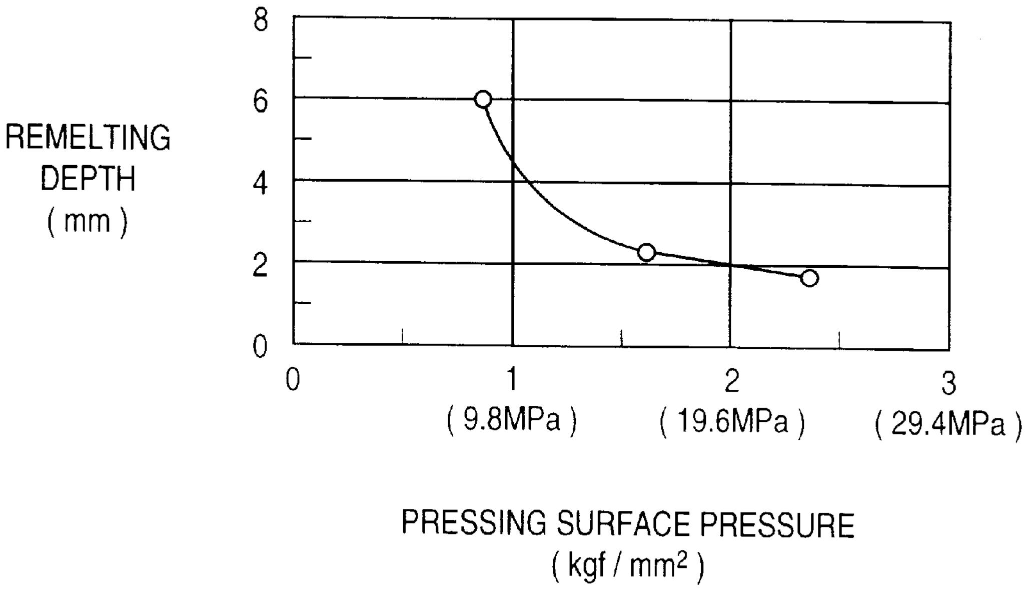
Figure 30:
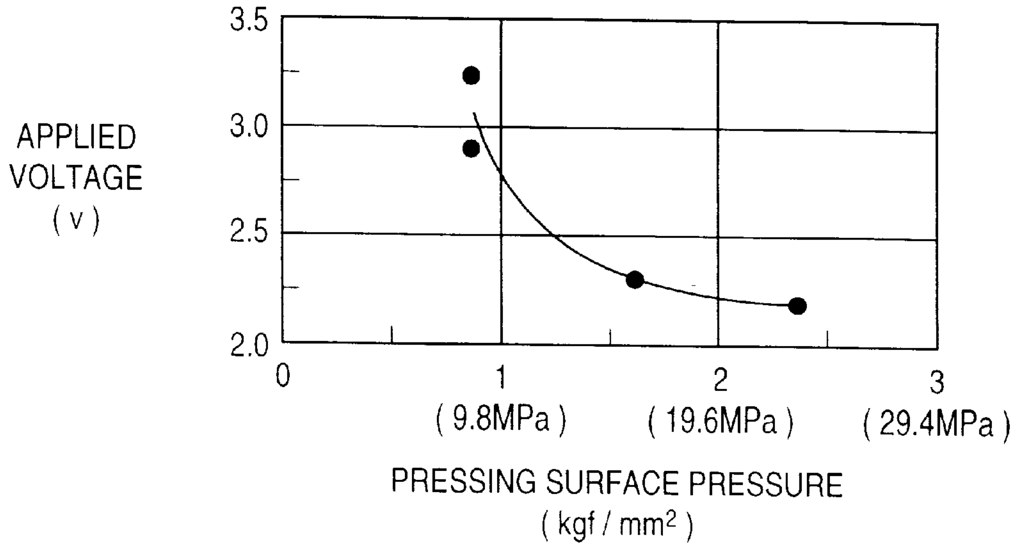
Figure 31:
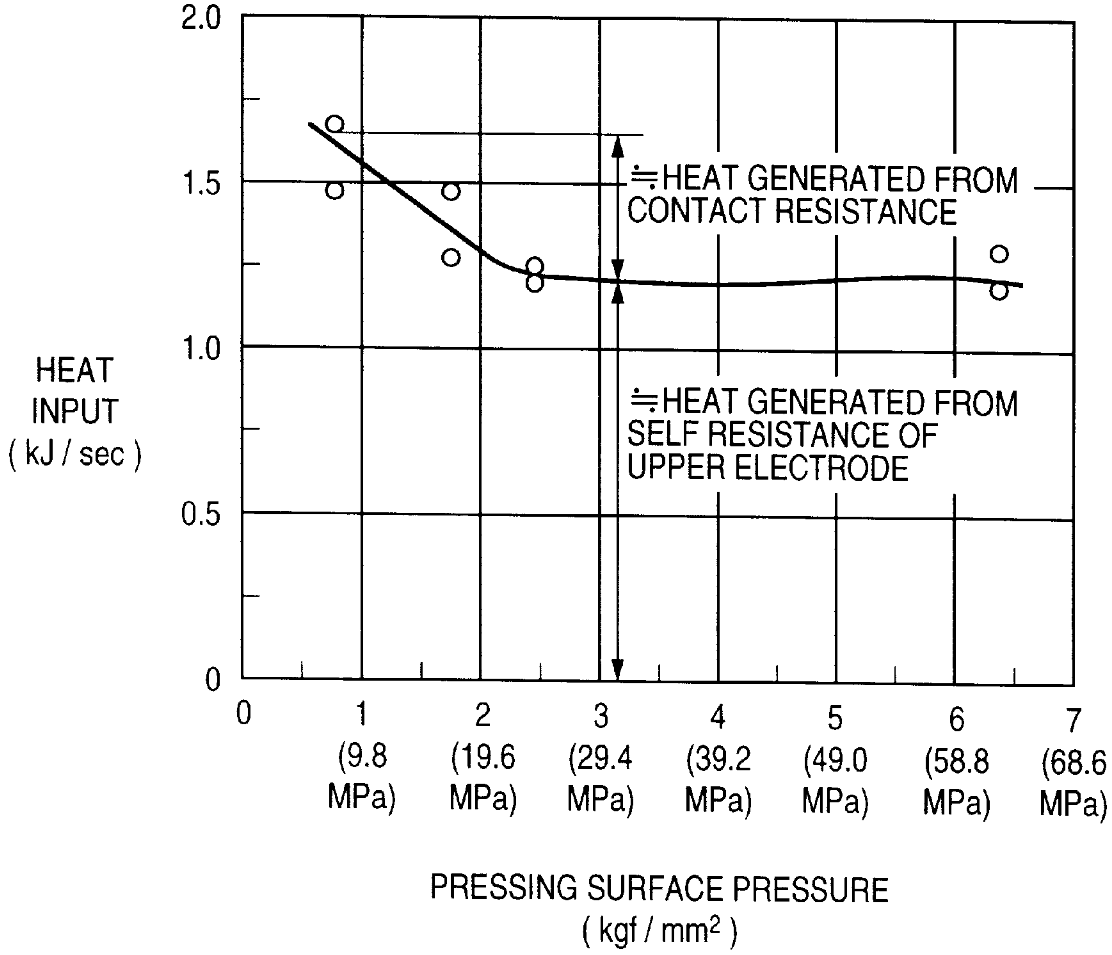
Figure 32:
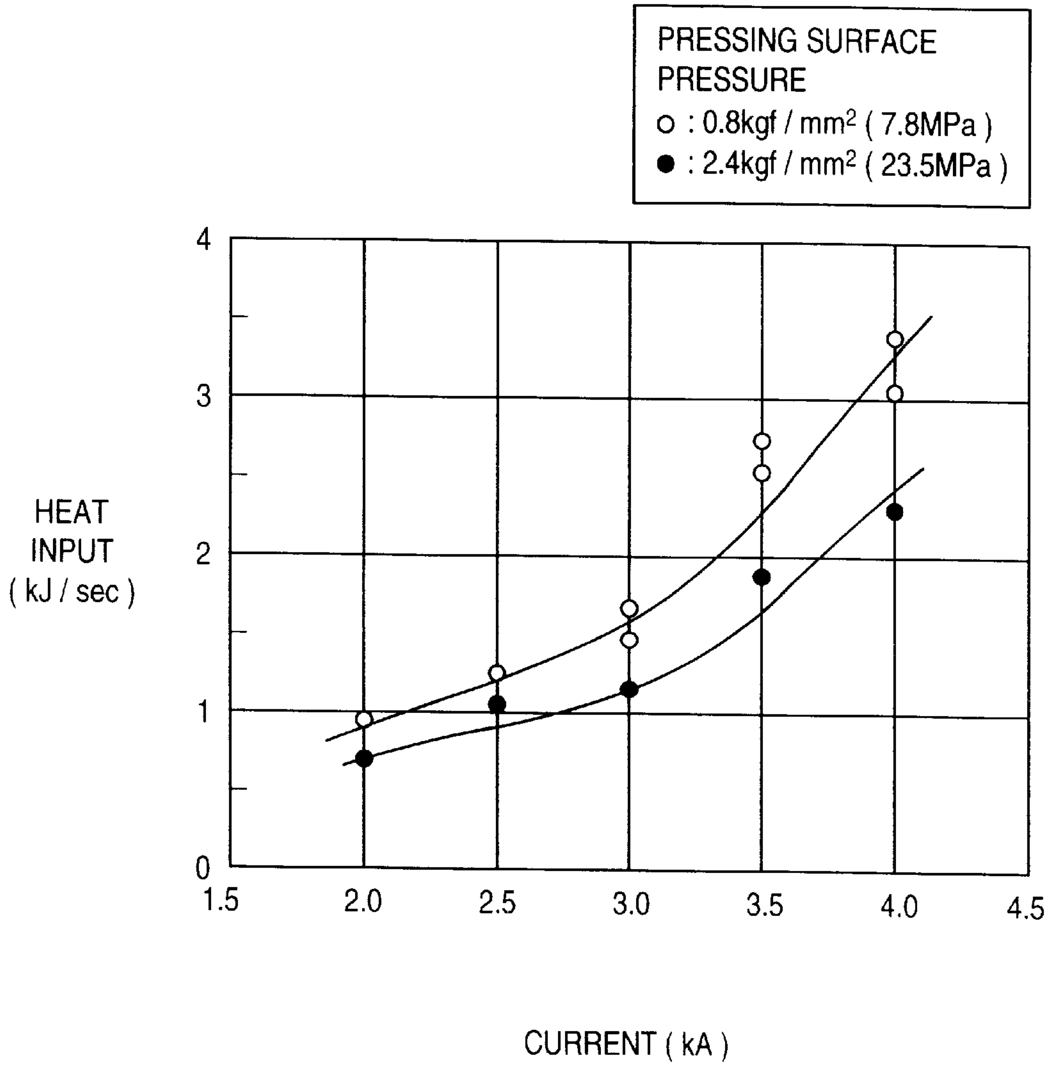
Figure 33:
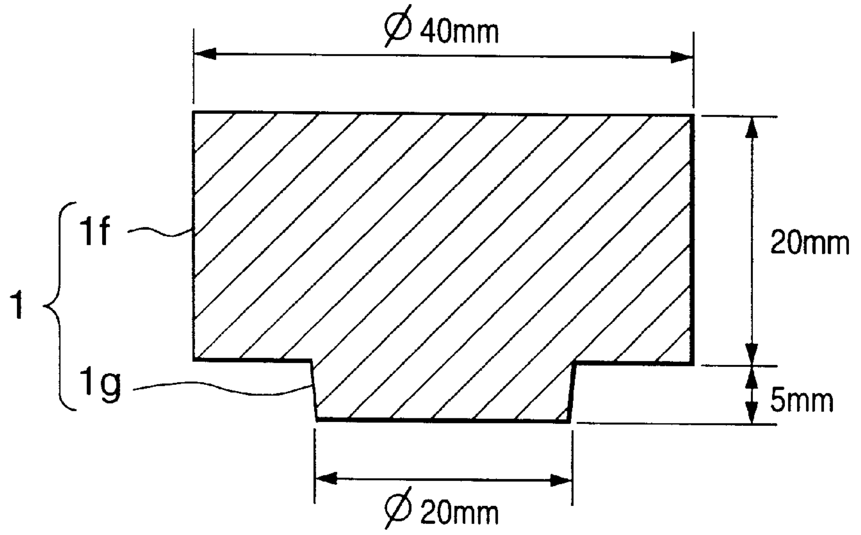
Figure 34:
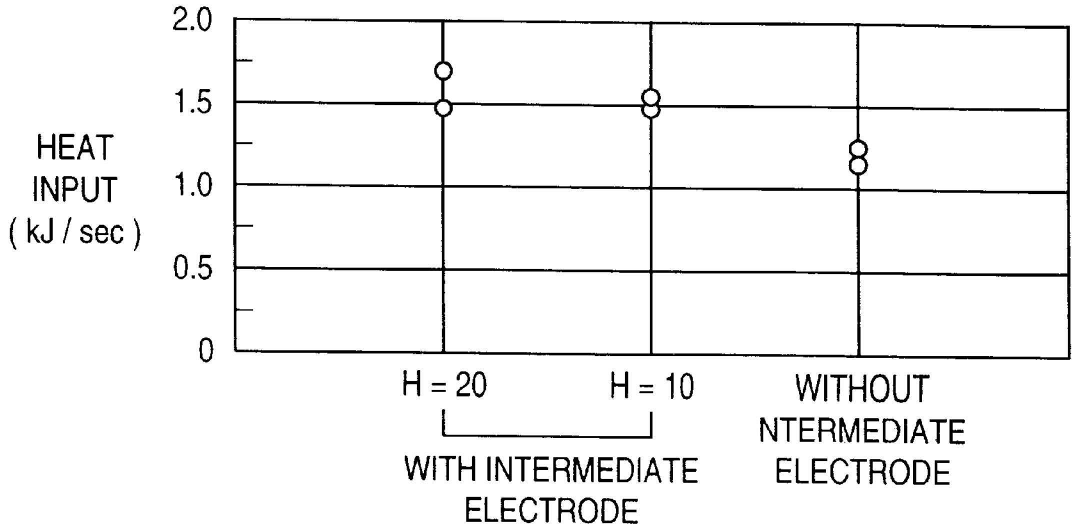
Figure 35:
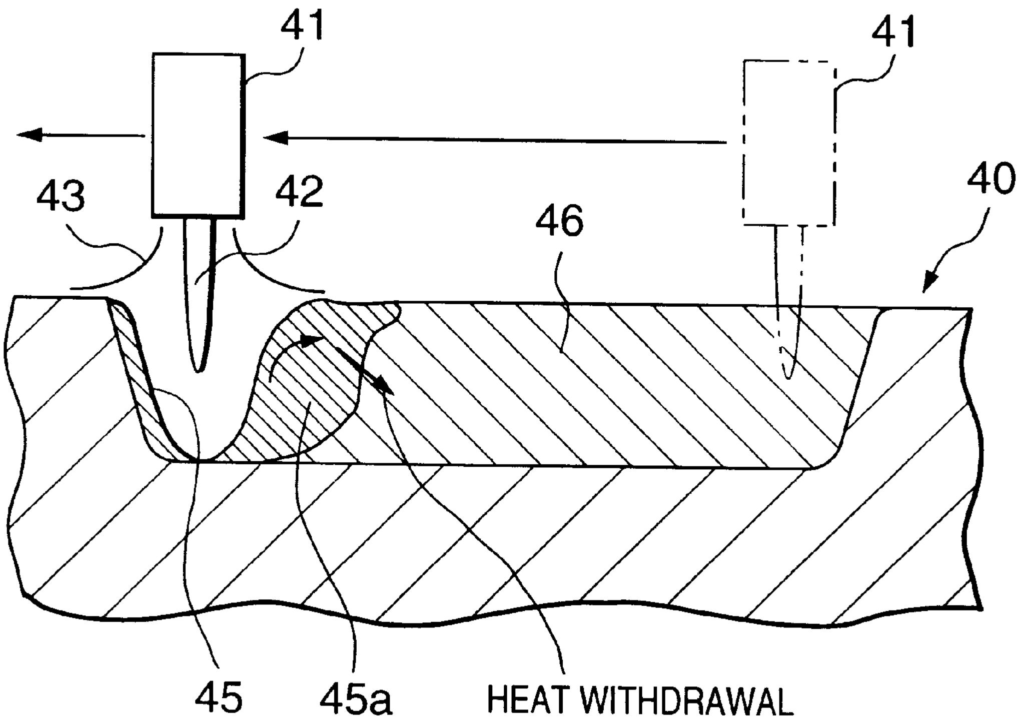
FIG. 35 ( PRIOR ART )

they correspond to FIG. 1;

FIG. 4A and FIG. 4B are side views illustrative of another embodiment of an upper electrode;

FIG. 5 shows an inter-valve section of a cylinder head that has been formed so that it projects; it corresponds to FIG. 1;

FIG. 6A and FIG. 6B show an upper electrode with a conical bottom; they correspond to FIG. 1;

FIG. 7 is an enlarged sectional view showing V grooves of the bottom end surface of the upper electrode;

FIG. 8 is an enlarged sectional view showing a U-shaped recess of the bottom end surface of the upper electrode;

FIG. 9 illustrates a case wherein a second work is welded to a first work; it corresponds to FIG. 1;

FIG. 10 illustrates a case where an alloying process is implemented; it corresponds to FIG. 1;

FIG. 11 illustrates a state after the alloying process is completed; it corresponds to FIG. 1;

FIG. 12 shows the electric heating treatment apparatus 100 according to another embodiment; it corresponds to FIG. 1;

FIG. 13 is a top plan view showing a test piece 10;

FIG. 14 is a sectional view taken at the line XIV—XIV of FIG. 13;

FIG. 15 is a sectional view showing an upper electrode composed of a tungsten pipe into which a carbon part has been press-fitted or shrink-fitted;

FIG. 16 shows the electric heating treatment apparatus 100 according to still another embodiment; it corresponds to FIG. 1;

FIG. 17 is a top plan view showing the test piece 10;

FIG. 18 shows a graph illustrative of the relationship between the distance from a surface and hardness of the test piece between two through holes after the electric heating treatment;

FIG. 19 is a photomicrograph illustrative of the structure condition of the area between the two through holes of the test piece after a remelting treatment wherein an electric heating treatment is applied to the upper suface of the photomicrograph;

FIG. 20 is an enlarged view of a portion near the surface of a surface portion to which the upper electrode is applied; it corresponds to FIG. 19;

FIG. 21 is an enlarged view of a portion far from the surface of the surface portion to which the upper electrode is applied; it corresponds to FIG. 19;

FIG. 22 is a further enlarged view of the surface portion to which the upper electrode is applied; it corresponds to FIG. 19;

FIG. 23 is a view showing a test piece having a casting defect;

FIG. 24 is a photomicrograph illustrative of the structure of an area in the vicinity of an alloy layer observed when localized alloying has been implemented wherein an electric heating treatment is applied to the upper suface of the photomicrograph;

FIG. 25 is a photomicrograph illustrative of the structure of an interface between the test piece and a column after the process wherein an electric heating treatment is applied to the upper suface of the photomicrograph;

FIG. 26 shows a graph illustrative of the influences exerted on a thermal fatigue life by the remelting treatment and the softening process in an aluminum alloy component;

FIG. 27 is a sectional view illustrating a piston apex portion being subjected to the remelting;

FIG. 28 is a sectional view illustrative of detailed dimensions of the upper electrode and an intermediate electrode;

FIG. 29 shows a graph illustrative of a relationship between the pressure of a pressing surface and a remelting depth;

FIG. 30 shows a graph showing a relationship between the pressure of the pressing surface and applied voltage;

FIG. 31 shows a graph showing a relationship between the pressure of the pressing surface and the amount of heat input to a work;

FIG. 32 shows a graph showing a relationship between electric current value and the amount of heat input to the work;

FIG. 33 is a sectional view illustrative of the upper electrode when the intermediate electrode is not used in the measurement of the heat input amount;

FIG. 34 shows a graph illustrative of the heat input to the work when the intermediate electrode is used and when it is not used; and FIG. 35 is a schematic representation illustrative of a conventional arc-based remelting treatment.

DESCRIPTION OF THE PREFERRED EMBODIMENT

Embodiments in accordance with the present invention will now be described in conjunction with the accompanying drawings. FIG. 1 schematically shows an electric heating treatment apparatus 100 in accordance with an embodiment of the present invention. The apparatus 100 is used to remelt a surface portion 10*b* (see FIG. 2 and FIG. 3) of each inter-valve section 10*a* in a cylinder head 10 or a work of a diesel engine, the apparatus 100 having an upper electrode 1 at the top thereof and a lower electrode 2 at the bottom thereof. The lower electrode 2 is formed of a copper constituent that exhibits an extremely low self heat generation when energized as it will be discussed later, and serves as a receiving pedestal that supports the cylinder head 10.

On the other hand, the upper electrode 1 is composed of a carbon constituent characterized by extremely high self heat generation when energized. The upper electrode 1 is formed into a columnar shape so that its bottom distal end surface is abutted against and held in contact with the cylinder head 10. The upper electrode 1 is configured such that it is able to relatively move vertically and horizontally with respect to the lower electrode 2, and it is also able to apply a certain pressure to the cylinder head 10 placed on the lower electrode 2. The upper and lower electrodes 1 and 2 are connected to a power supply 6 via a switch 5. When the switch 5 is closed with the upper electrode 1 abutted against the cylinder head 10, electric current of a certain ampere value flows through the upper electrode 1, the cylinder head 10, and the lower electrode 2.

Figure 2:
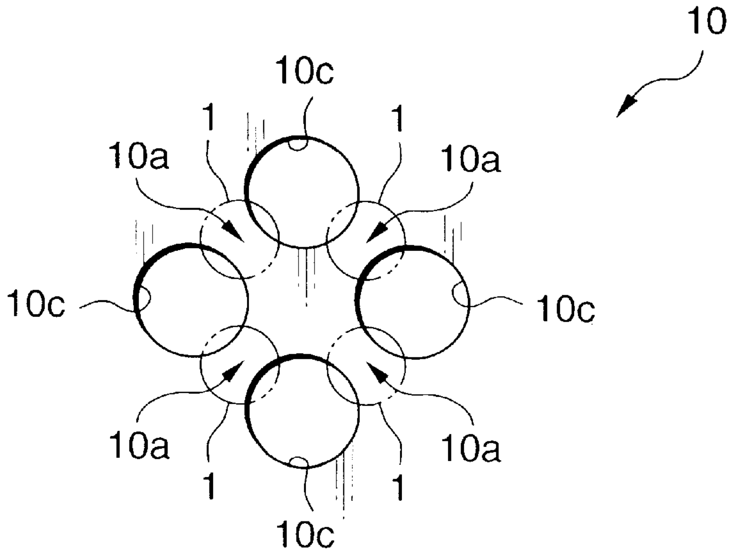
FIG. 2 is a top plan view showing the surfaces of inter-valve sections of a cylinder head.

The cylinder head 10 is formed of an aluminum alloy cast constituent made by casting. The cylinder head 10 is provided with four holes 10*c*, 10*c* and so on that are arranged nearly at equal intervals in the circumferential direction as shown in FIG. 2. Of the four holes 10*c*, 10*c*, and so on, the two that are not adjacent to each other are provided for an intake port and the remaining two are provided for an exhaust port and a subsidiary combustion chamber. The distal end surface of the upper electrode 1 is sequentially abutted against the surface of each inter-valve section 10*a* located between two adjoining holes 10*c* and 10*c* so as to locally remelt only the surface portion 10*b* of the inter-valve section 10*a* as it will be discussed later. More specifically, the area of the distal end surface of the upper electrode 1 is approximately equal to the surface area of each inter-valve section 10*a*, a part of the distal end surface of the upper electrode 1 being positioned above the two through holes 10*c* and 10*c* when the distal end surface of the upper electrode 1 comes in contact with the surface of each inter-valve section 10*a*. Thus, in the cylinder head 10, only the surface portion 10*b* of each inter-valve section 10*a*, which is the surface portion in contact with the upper electrode 1, is treated.

The method by which the surface portions 10*b* of the respective inter-valve sections 10*a* of the cylinder head 10 are remelted by the electric heating treatment apparatus 100 configured as explained above will now be described. First, all the inter-valve sections 10*a* of the cast cylinder head 10, which are to be remelted, and the surfaces around them are pre-machined to smooth them by removing the pits and projections of the casting surface. Then, the cylinder head 10 is rested on the top of the lower electrode 2 such that the surfaces of the inter-valve sections 10*a* face upward. After that, the upper electrode 1 is moved downward and horizontally to bring it almost into close contact with the surface of one inter-valve section 10*a*.

Figure 3A:
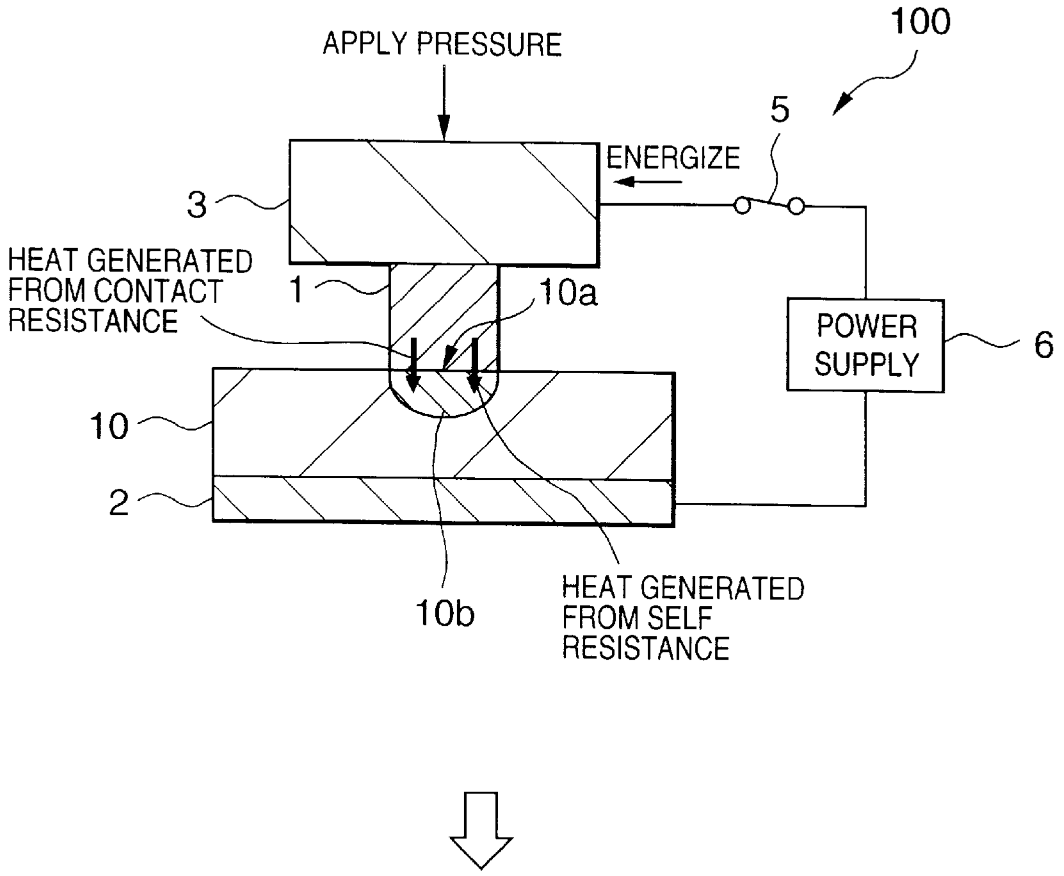
FIG. 3A and FIG. 3B show remelting treatment being carried out on the surfaces of the inter-valve sections.

Subsequently, as shown in FIG. 3A, the switch 5 is closed to start supplying electric current and pressure is applied to the cylinder head 10 by a main body electrode 3 and the upper electrode 1. As this condition is maintained, the surface portion 10*b* of the inter-valve section 10*a* of the cylinder head 10 is locally heated by the heat generated from the self resistance of the upper electrode 1 and the heat generated from the contact resistance at the interface between the distal end surface of the upper electrode 1 and the surface of the inter-valve section 10*a* of the cylinder head 10. This causes the surface portion 10*b* to reach the melting point of aluminum and melt. In a few seconds after the melting, the switch 5 is opened to interrupt the supply of electric current. Almost as soon as the supply of electric current is stopped, the application of pressure by the upper electrode 1 is also stopped. The upper electrode 1, however, is held almost in close contact with the surface of the inter-valve section 10*a* at least until the solidification of the surface portion 10*b* of the inter-valve section 10*a* is completed following the interruption of the supply of electric current.

The foregoing energizing time is preset according to the relationship between the pressing force, i.e. the pressing surface pressure applied to the surface of the inter-valve section 10*a*, and current value, i.e. the current density at the surface of the inter-valve section 10*a*. The pressure of the pressing surface is set to 14.7 MPa (0.5 $kgf/mm^2$) or less. Setting the pressure of the pressing surface at a value higher than 14.7 MPa would cause the amount of heat generated from the aforesaid contact resistance to be stabilized at a small value with a resultant small remelting depth and prolonged treatment time. Therefore, the pressure is set to 14.7 MPa or less as mentioned above. The current density is set such that the surface portion 10*b* of the inter-valve section 10*a* is melted by the foregoing two types of generated heat before the heat is hardly transmitted to portions other than the surface portion 10*b* of the inter-valve section 10*a*. In order to securely carry out the remelting treatment, the current density is set so that the temperature of the distal end of the upper electrode 1 reaches the melting point of aluminum or higher when electric current is supplied.

Figure 3B:
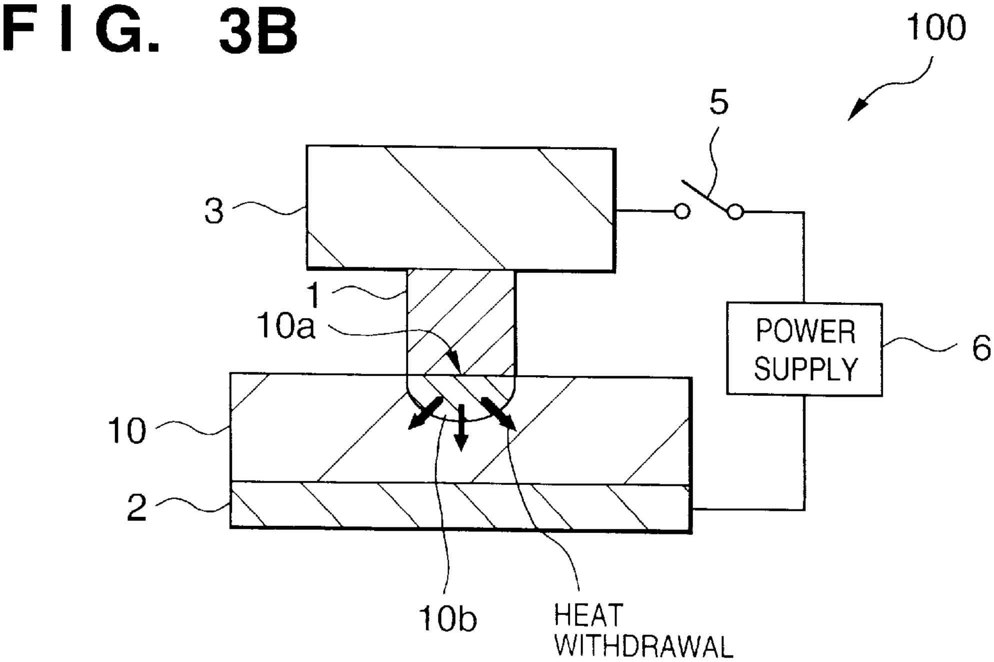

As illustrated in FIG. 3B, the heat at the melted surface portion 10*b* of the inter-valve section 10*a* is dispersed by being radiated toward a base material when the supply of electric current is interrupted. The temperature of the upper electrode 1 itself, however, does not immediately lower, and hence, the heat is not radiated from the surface of the inter-valve section 10*a* to the upper electrode 1. Therefore, the surface portion 10*b* of the inter-valve section 10*a* is quickly cooled from the base material toward the surface, thus achieving the directive solidification. This pushes out casting defects such as minute blow holes that existed before the remelting treatment was carried out, enabling degassing to be performed securely. Furthermore, since the upper electrode 1 is maintained nearly in close contact with the surface of the inter-valve section 10*a*, the surface of the inter-valve section 10*a* is not exposed to air during the remelting treatment and thus protected from oxidization. As result, the surface portion 10*b* of the inter-valve section 10*a* obtains a fine structure, and the structure homogeneously extends from the base material to the surface.

In the next step, the upper electrode 1 is moved to and brought in contact with the surface of the next inter-valve section 10*a*. The same procedure as described above is repeated until all the inter-valve sections 10*a* of the cylinder head 10 are remelted. At this time, the remelted inter-valve sections 10*a* are dented by having been subjected to pressure and are accordingly lower than the surface surrounding them. The top surface of the cylinder head 10 (the top surface becomes the bottom surface when the cylinder head is assembled in an engine) is cut and subjected to finish machining to eliminate the dents from all the inter-valve sections 10*a*.

Lastly, T6 heat treatment is conducted on the cylinder head 10 in the same method as a conventional method. This brings the hardness of the surface portions 10*b* of the inter-valve sections 10*a* back almost to the hardness before the remelting treatment was carried out. The hardness of a portion that has been softened by the heat radiated when the surface portions 10*b* of the inter-valve sections 10*a* solidified can be also restored. Furthermore, the residual stress that has been produced in the cylinder head 10 is removed.

Thus, in the remelting treatment according to the electric heating treatment method in the foregoing embodiment, the heat generated from the self resistance of the upper electrode 1 itself and the heat generated from the contact resistance at the interface between the upper electrode 1 and the cylinder head 10 are concentrated only on the surface portion 10*b* of one inter-valve section 10*a* of the cylinder head 10. Hence, even when the heat conductivity of the cylinder head 10 is high, the surface portion 10*b* can be locally heated and melted. Moreover, the electric heating treatment method according to the embodiment does not produce craters, which are produced in the conventional arc remelting treatment. This permits extremely localized treatment only on the inter-valve sections 10*a* requiring the remelting treatment, obviating the need for performing the treatment on surrounding areas that do not require the treatment. Therefore, the crack problem caused by unwanted heat stress can be solved. In addition, the surface portion 10*b* of the inter-valve section 10*a* against which the upper electrode 1 is abutted is securely treated without the displacement problem attributable to the magnetic blow or the like. Further, there is no need to use a shielding gas for preventing the surfaces from being oxidized, and good degassing effect is provided. Thus, the remelting treatment can be accomplished easily, and the quality of the cylinder head 10 can be improved over that obtained by the conventional methods.

In the above embodiment, the upper electrode 1 has been formed into the columnar shape. Preferably, the upper electrode 1 is shaped such that the area of the section nearly parallel to the surface of the inter-valve section 10*a* of the cylinder head 10 is smaller than the area of the bottom end surface thereof without changing the area of the distal end surface thereof. Specifically, the upper electrode 1 may shaped so that, for example, it is narrowed at its middle in the vertical direction as shown in FIG. 4A, or it may have a conical, trapezoidal shape in which the diameter decreases upward as shown in FIG. 4B. Shaping like this makes it possible to increase the resistance value of the upper electrode 1 without changing the surface treatment range, and therefore the amount of heat generated by the resistance of the upper electrode 1 itself can be increased. This means that the localized remelting treatment can be performed further effectively. The bottom end surface of the upper electrode 1 does not have to be round; it may be of any other shape as long as it matches the shape of a portion to be treated. Likewise, the upper electrode 1 may be formed of a constituent other than the carbon component.

In the foregoing embodiment, the inter-valve sections 10*a* become lower than the surrounding surfaces thereof after the remelting treatment since they are pressed by the upper electrode 1. As shown in FIG. 5, the difference in height between the inter-valve sections 10*a* and the surrounding surfaces thereof after the remelting treatment can be reduced by forming the inter-valve sections 10*a* of the cylinder head 10 beforehand at the time of casting such that they jut out from the surrounding surface by approximately the amount of the estimated recessions caused by the remelting treatment. By so doing, the finish machining cost can be reduced. Furthermore, only the projecting surfaces of the inter-valve sections 10*a* are machined in the pre-machining process for smoothing the surfaces of the inter-valve sections 10*a* prior to the remelting treatment, obviating the need for machining the surrounding areas. Hence, the machining processes before and after the surface treatment can be simplified with consequent reduction in cost.

When projecting the inter-valve sections 10*a* from the surrounding surfaces thereof as mentioned above, the bottom end portion of the upper electrode 1 should be shaped conically such that the diameter thereof is tapered toward the distal end as illustrated in FIG. 6. This provides the following advantage: the upper electrode 1 is nearly in point contact with the surface of the inter-valve section 10*a* of the cylinder head 10 as shown in FIG. 6A before it is energized and heated; when it is energized and heated, the surface portion 10*b* of the inter-valve section 10*a* is plastically deformed as it is pressed by the upper electrode 1, so that the contact areas of the two increase as illustrated in FIG. 6B. Hence, even if the surfaces of the inter-valve sections 10*a* are casting surfaces, they can be securely maintained in the condition where they are welded by the upper electrode 1 at the time of electric heating, thus enabling such pre-machining as smoothing the surfaces to be omitted. Also, the generation of sparks can be reliably prevented. The central portion of the upper electrode 1 comes in contact with the surface of the inter-valve section 10*a* positively before the electric heating; therefore, uneven distribution of electric current does not take place in the upper electrode 1 in the initial stage of energization, and the electric current is distributed such that heat stress changes from the central portion toward the side peripheral surfaces. As a result, cracks in the upper electrode 1 caused by heat stress can also be prevented. It is further preferable to project the inter-valve sections 10*a* from the surrounding surfaces when the bottom end portion of the upper electrode 1 is conical; however, the foregoing advantage can be obtained even if they are not projected as in the embodiment. When the upper electrode 1 is provided with the portion with a smaller sectional area as described above, it may be shaped such that the area of the section in the smaller-sectional-area portion approximately parallel to the surfaces of the inter-valve sections 10*a* of the cylinder head 10 is smaller than the proximal end of the conical portion at the distal end portion thereof.

Further in the above embodiment, the upper electrode 1 is heated by the heat generated from the self resistance as soon as the supply of electric current is started. Preferably, the upper electrode 1 is heated to a predetermined temperature in advance before the electric heating is begun. Specifically, for example, the upper electrode 1 is abutted against the lower electrode 2 before placing the cylinder head 10 on the lower electrode 2, and the switch 5 is closed to supply electric current thereby to preheat the upper electrode 1. As an alternative, after one inter-valve section 10*a* has been remelted, the upper electrode may be brought in contact with another electrode to energize it for preheating while the upper electrode 1 is being moved to the next inter-valve section 10*a*. This makes it possible to increase the temperature of the upper electrode 1 in the initial stage of energization, so that the heat stress of the upper electrode 1 can be reduced. Hence, the cracks of the upper electrode 1 can be further effectively prevented, and the surface portions 10*b* of the inter-valve sections 10*a* of the cylinder head 10 can be quickly heated and melted.

The pressure applied during the energization should be set at 14.7 MPa (1.5 kgf/mm$^2$) or less and set as low as possible to increase the heat generated from the contact resistance; however, if it is set at an excessively low value, sparks may be produced. To avoid this, the voltage between the upper electrode 1 and the cylinder head 10, i.e. the contact resistance value, is monitored by a voltmeter, and the pressure force is increased if the voltage is higher than a set value, whereas it is decreased if the voltage is lower than the set value. This allows the amount of heat generated from the resistance to be increased as much as possible while preventing the generation of sparks. Providing the bottom end surface of the upper electrode 1 with a plurality of V-grooves 1*a*, 1*a*, and so on as shown in FIG. 7 reduces the actual contact area, permitting a further increase in the amount of heat generated from the contact resistance. Likewise, as shown in FIG. 8, a relatively large U-shaped recess 1*b* may be formed at the center of the bottom end surface of the upper electrode 1 in order to increase the amount of heat generated from the contact resistance. This is not very suited for the remelting treatment described above, but it can be applied to a softening process or the like that will be discussed later.

In the above embodiment, the electric heating treatment apparatus has been used to perform the remelting. As an alternative, however, the surface portion of the work against which the upper electrode 1 is abutted may be locally heated by the heat generated by the self resistance of the upper electrode 1 itself and the heat generated from the contact resistance at the interface of the distal end of the upper electrode 1 and the work thereby to perform the surface treatment of other surface with respect to the portion against which the upper electrode 1 is abutted. For example, softening treatment may be carried out on the inter-valve sections 10*a* of the cylinder head 10, or a lip or the like of a piston to soften them by heating them to an extent where they are not melted so as to improve the extension, thus enabling prolonged thermal fatigue life. It is also possible to perform heat treatment such as quenching, tempering, or annealing. Active utilization of pressing force permits localized forging, and if there is a casting defect such as a blow hole inside a work, the blow hole can be removed, thus reducing defects. Further, as illustrated in FIG. 9, a thin second work 13 formed of a constituent having, for example, high wear resistance, that is different from a first work 12, is placed on the top surface of the first work 12, and the upper electrode 1 is abutted against the top surface of the second work 13 and energized for heating. This allows the second work 13 to be welded to the top surface of the work 12 so as to locally reinforce the work 12.

The aforesaid electric heating treatment method can be also applied to locally alloying a work and a constituent different from the material of the work. More specifically, as shown in FIG. 10, a thin second work 16 formed of a constituent different from that of a first work 15 is inserted in a recession 15*a* formed in the top surface of the first work 15, then the upper electrode 1 is brought nearly in close contact with the top surfaces of both first and second works 15 and 16 to carry out the same remelting treatment. Thus, an alloy layer 17 formed of the compound of the constituents of the first and second works 15 and 16 are locally formed on the side peripheral portions of the second work 16, and the second work 16 is remelted as shown in FIG. 11. This alloying process can be applied to the inter-valve sections 10*a* of the cylinder head 10, the apex of a piston, a cam, etc. For instance, the wear resistance and thermal fatigue life can be improved easily by using a castable aluminum alloy constituent such as AC4D specified by H5202, JIS Standard for the first work 15 and an aluminum alloy such as A2219, which exhibits especially high resistance to heat at the sacrifice of castability, for the second work 16.

In the alloying process described above, the second work 16 is made of a porous metal constituent and the second work 16 is cast in or compounded to the portion to be treated, namely, the surface portion against which the upper electrode 1 is abutted, of the first work 15 before electric heating. Then the first and second works 15 and 16 may be alloyed by electric heating. Thus, even if the works are composed of elements having a relatively high electric conductivity, they can be easily melted. This means that various elements can be uniformly and easily melted on the first work 15.

Further, in the embodiment, the upper electrode 1 is directly attached to the main body electrode 3. Preferably, however, a separate intermediate electrode 4, the area of the section of which is nearly parallel to the surface of the inter-valve section 10*a* of the cylinder head 10 is equal to or not less than that of the upper electrode 1 and the electric conductivity of which is equal to or not more than that of the upper electrode 1, is provided between the upper electrode 1 and the main body electrode 3 as shown in FIG. 12. In this case, if the upper electrode 1 is composed of a carbon constituent, then the intermediate electrode 4 should be also composed of the carbon constituent, which is separate from the upper electrode 1. Providing the intermediate electrode 4 causes the heat to be generated from contact resistance also between the upper electrode 1 and the intermediate electrode 4, and the transmission of the heat generated by the self resistance of the upper electrode 1 to the cooled main body electrode 3 is restrained, allowing the heat to be securely transferred to the cylinder head 10. Since the area of the section nearly parallel to the surface of the inter-valve section 10*a* of the cylinder head 10 in the intermediate electrode 4 is equal to or not less than the upper electrode 1, it is possible to prevent the reduction in the heat generated from the self resistance of the upper electrode 1 caused by the installation of the intermediate electrode 4. Hence, the efficiency of heating the inter-valve sections 10*a* of the cylinder head 10 can be improved.

In the foregoing embodiment, the distal end surface of the upper electrode 1 is flat, and a part of which is located above the two through holes 10*c* and 10*c*. Preferably, as shown in FIG. 13 and FIG. 14, the portions of the distal end surface of the upper electrode 1 that correspond to the through holes 10*c* are provided with restricting sections 1*c* and 1*c* for restricting a melted constituent in the inter-valve sections 10*a* of the cylinder head 10 from running into the through holes 10*c* at the time of electric heating. More specifically, the restricting sections 1*c* project along the peripheral portions of the respective through holes 10*c* from the distal end surface of the upper electrode 1 into the respective through holes 10*c*, thus restricting the melted constituent of the inter-valve sections 10*a* from dripping into the through holes 10*c*. This makes it possible to restrain the deterioration of the quality of the surface portions 10*b* of the inter-valve sections 10*a* of the cylinder head 10, and of the through holes 10*c*.

When using a carbon constituent for the upper electrode 1, it is preferable to form the upper electrode 1 by press-fitting or shrink-fitting a carbon member 1*d* into a tungsten pipe 1*e* to combine the two members as illustrated in FIG. 15. This is preferable for the following reason: the outer peripheral surface of the upper electrode 1 in the above embodiment is exposed to open air and prone to be oxidized and worn; the tungsten pipe 1*e* has a high melting point and securely protects the surface of the carbon member 1*d*. Therefore, the wear of the upper electrode 1 from oxidization can be effectively restrained, leading to longer service life of the upper electrode 1. In place of the tungsten pipe 1*e*, a SiC film may be formed on the outer peripheral surface of the carbon member 1*d* to restrain the wear of the upper electrode 1 from oxidization.

Furthermore, in the embodiment described above, the lower electrode 2 is composed of a copper constituent; it may alternatively be composed of a carbon constituent as in the case of the upper electrode 1. In this case, however, the upper electrode 1 and the lower electrode 2 must be energized, with the area of the contact between the lower electrode 2 and the cylinder head 10 being larger than the area of contact between the upper electrode 1 and the cylinder head 10. In other words, the contact resistance between the lower electrode 2 and the cylinder head 10 is minimized to prevent the bottom side of the cylinder head 10 from melting.

An embodiment that has been actually implemented will now be described.

As shown in FIG. 16, the upper electrode 1 of the electric heating treatment apparatus 100 was formed of a carbon constituent, and composed to have a large-diameter portion 1*f* having a diameter of 50 mm and a height of 25 mm and a small-diameter portion 1*g* that was provided beneath the large-diameter portion 1*f* and that had a diameter of 20 mm and a height of 5 mm. The lower electrode 2 and the main body electrode 3 were made of a copper constituent. A 25 mm-thick aluminum test piece 20 made of AC4D conforming to the JIS Standard was fabricated. Two through holes 20*a* and 20*a* having a diameter of 14 mm were formed at approximately the center of the test piece 20, a minimum distance of 11 mm being provided between the two through holes 20*a* and 20*a* as shown in FIG. 17. In other words, the portion between the two through holes 20*a* and 20*a* were made so that it is almost the same as one inter-valve section 10*a* of the cylinder head 10 in the aforesaid embodiment.

The test piece 20 was rested on the lower electrode 2 and the small-diameter portion 1*g* of the upper electrode 1 was brought nearly in close contact with the surface between the two through holes 20*a* and 20*a* of the test piece 20, then the switch 5 was closed to start supply of electric current and the test piece 20 was pressed by the upper electrode 1. At this time the pressing force was set to 6865N (700 kgf) so that the surface pressure was approximately 21.6 MPa (2.2 $kgf/mm^2$). The current value was set to three different values, namely, 2 kA (current density: 6.4 $A/mm^2$), 3 kA (current density: 9.6 $A/mm^2$), and 4 kA (current density: 12.7 $A/mm^2$). The energizing time was changed according to the foregoing current values and set to 12 sec., 18 sec., and 50 sec., respectively. Under the three conditions, the hardness of the portion between the two through holes 20*a* and 20*a* of the test piece 20 after the electric heating treatment was measured down to 20 mm deep from the top surface.

The measurement results of the hardness are shown in FIG. 18. Thus, it is understood that the remelting was not performed when the current value was set to 4 kA (energizing time: 12 sec.), and the hardness was higher than the cases at other current values down to about 5 mm from the surface. Although the lower side right below the remelted portion was softened due to the influences of heat radiation, softening was hardly observed at about 10 mm or lower, showing that the localized heating controlled the thermal influences.

On the other hand, in the cases where the current value was set to 2 kA (energizing time: 18 sec.) and 3 kA (energizing time: 50 sec.), the temperature was not increased to the melting point even after prolonged heating, and it is understood that the whole test piece 20 was softened due to heat conduction. This means that the remelting treatment must be carried out quickly at high current density. The softening must also be carried out quickly before the heat is conducted to other portions and it should be finished within approximately 10 seconds (melting starts when the softening takes more than 10 seconds) at a large current value of about 4 kA.

Further, in the case wherein the current value was 4 kA, the structural condition between the two through holes 20*a* and 20*a* of the test piece 20 after the treatment was observed under a microscope. The observation results are shown in FIG. 19 through FIG. 22. From FIG. 19 wherein the magnification is ×5, it is understood that the structure of the surface portion of the test piece 20 against which the upper electrode 1 was abutted has been remelted and become finer than the lower portion. The structure of the surface portion against which the upper electrode 1 was abutted indicates about 8 $\mu$m in terms of DAS, which is an index indicative of the fine structure. This level of structure fineness is approximately the same as that obtained by the remelting treatment performed by the conventional arc methods. FIG. 20 and FIG. 21 (magnifications are ×50 in both graphs) are enlarged views of the portion against which the upper electrode 1 has been abutted, FIG. 20 showing the area closer to the surface and FIG. 21 showing the area farther from the surface, respectively. FIG. 22 (magnification: ×400) gives a further enlarged view of the portion against which the upper electrode 1 has been abutted. From these enlarged views, it is understood that the structure has uniformly extended almost vertically, proving that the directive or directional solidification has been positively accomplished.

Observation has been made with another test piece 20 that has a casting defect, namely, many blow holes. The test piece 20 was subjected to the remelting treatment under the same conditions as mentioned above, the current value being set to 4 kA, then the structure condition of the area between the two through holes 20*a* and 20*a* of the test piece 20 was observed under a microscope. The result is shown in FIG. 23 (magnification: ×5). It can be seen that degassing has been reliably accomplished by the directive solidification.

Then, a recession was formed in the top of the test piece 20 and a columnar member was fitted in the recession as shown in FIG. 10 to locally alloy them under the same conditions as mentioned above, the current value being set to 4 kA. The A2219 aluminum alloy constituent was used for the columnar member. The structure condition of the alloy layer was observed under a microscope, the result of which is shown in FIG. 24 (magnification: ×10). It is understood that the alloy layer, which is a compound of the test piece 20 and the columnar member, has been locally formed on the side peripheral portions of the columnar member, and the remelting of the columnar member has been successfully achieved.

Subsequently, as illustrated, a columnar member measuring 30 mm in diameter and 10 mm in height was placed on the top surface of the test piece 20, and the columnar member was welded to the test piece 20 under the same conditions as mentioned above, the current value being set to 4 kA. An A390 aluminum alloy, which is a hyper-eutectic Si alloy, was used for the columnar member. The upper electrode 1 had only the large-diameter portion 1*f*, and the lower electrode 2 used the same carbon constituent as the upper electrode 1. The structure condition of the interface between the columnar member and the test piece was observed under a microscope, the result of which is shown in FIG. 21 (magnification: ×200). From this figure, it is understood that the test piece 20 and the columnar member have been positively welded together by diffusion welding.

FIG. 26 shows the results of a test on how the remelting and softening of the foregoing aluminum alloy constituent influences the thermal fatigue life (test temperature: 300 degrees Celsius). The softening was conducted while maintaining the temperature at 300 degrees Celsius, and the remelting treatment included the T6 heat treatment. Comparison between an F constituent that has undergone no treatment and the T6 constituent that has undergone the heat treatment reveals that the one subjected to the remelting treatment exhibits significantly prolonged thermal fatigue life. It is also seen that the thermal fatigue life is prolonged also by softening.

In FIG. 26, "$\eta$" denotes a strain suppressing factor represented by a formula given below.

$$\eta=\Delta\epsilon t/(\alpha\cdot\Delta T)=(\Delta 1f-\Delta 1)/\Delta 1f$$

where $\Delta\epsilon t$ denotes a whole strain range, $\alpha$ denotes a linear expansion coefficient, $\Delta T$ denotes the difference between a maximum temperature and a minimum temperature, $\Delta 1f$ denotes a displacement magnitude at the time of free expansion and contraction, and $\Delta 1$ denotes a displacement magnitude observed when the test piece is restrained in its expansion and contraction.

Subsequently, as illustrated in FIG. 27, the apex portion of a piston 25 was remelted, and the relationship between pressing surface pressure and remelting depth was studied. For this test, the intermediate electrode 4 made of a carbon constituent was provided between the upper electrode 1 made of the carbon constituent and the main body electrode 3 made of a copper constituent. The detailed dimensions of the upper electrode 1 and the intermediate electrode 4 are shown in FIG. 28. Height H of the upper electrode 1 was 20 mm, the current value was set to 3 kA, and the energizing time was 46 seconds. An aluminum alloy casting, namely, AC8A specified by H5202 JIS Standard, was employed for the piston 25. The applied voltage for obtaining the current value of 3 kA was also checked.

The results are shown in FIG. 29. The relationship between the pressing surface pressure and the applied voltage is shown in FIG. 30. From these graphs, it has been revealed that the remelting depth can be increased by setting the pressing surface pressure to 14.7 MPa (1.5 kgf/mm$^2$) or less. This is because a lower pressing surface pressure causes an increase in the contact resistance or the applied voltage as shown in FIG. 30, and the heat generated from the contact resistance increases.

Subsequently, the relationship between the pressing surface pressure and the heat input to a work was studied. For this purpose, the same aluminum alloy casting plate (size: 80×70×20 mm) as that for the piston 25 was employed for the work. Current of 3 kA was supplied for 20 seconds, and the heat input to the work was measured using a calorimetric method in which the heated plate was immersed in a certain volume, namely, 500 grams, of water and the rise in the water temperature was measured to determined the heat input amount. The relationship between the current value and the heat input to the work was also checked on a case where the pressing surface pressure was 7.8 MPa (0.8 kgf/mm$^2$) and a case where it was 23.5 MPa (2.4 kgf/mm$^2$).

The relationship between the pressing surface pressure and the heat input to the work is shown in FIG. 31, and the relationship between the current value and the heat input to the work is shown in FIG. 32. It has been found that the relationship between the pressing surface pressure and the heat input is similar to the relationship between the pressing surface pressure and the remelting depth. Further, it has been revealed that, if the pressing surface pressure exceeds 23.5 MPa (2.4 kgf/mm$^2$), then the heat generated from the contact resistance becomes almost zero and only the heat generated from the self resistance of the upper electrode remains, whereas if the pressing surface pressure is 23.5 MPa (2.4 kgf/mm$^2$) or less, then the amount of the heat generated from the self resistance remains unchanged and the heat input amount increases by the amount of the heat generated from the contact resistance as it increases. The same applies even when the current value is changed. Thus, the heat input to the work can be increased by setting the pressing surface pressure to 14.7 MPa (1.5 kgf /mm$^2$) or less, considering the relationship between the pressing surface pressure and the heat input to the work and the relationship between the pressing surface pressure and the remelting depth. This permits a larger remelting depth and a shorter treatment time.

Next, the upper electrode was formed to be 10 mm in height H, and the heat input to the work, namely, the plate, was measured in the same procedure as described above. Further, the upper electrode 1 was configured to have the large-diameter portion 1*f* and the small-diameter portion 1*g* made integral with the large-diameter portion 1*f* as illustrated in FIG. 33, and the heat input to the work was measured without using the intermediate electrode 4. At this time, the pressing surface pressure was set to 7.8 MPa (0.8 kgf/mm$^2$).

The measurement results are shown in FIG. 34. The measurement obtained for H=20 in FIG. 34 is identical to the measurement obtained when the pressing surface pressure in FIG. 31 was 7.8 MPa (0.8 kgf/mm$^2$). This indicates that the use of the intermediate electrode increases the heat input regardless of height H of the upper electrode.

Thus, according to the electric heating treatment method or apparatus described above, the surface portion of the work against which the electrode is abutted can be locally heated by both the heat generated from the self resistance of the energization electrode itself and the heat generated by the contact resistance at the interface between the distal end of the energization electrode and the work by supplying current to the energization electrode and the work, with the distal end of the electrode being held nearly in close contact with the surface of the work. This makes it possible to implement predetermined surface treatment easily and to improve the quality of the surface treatment.

Moreover, optimum specific surface treatment can be accomplished by remelting a work or alloying the work and a constituent different from that of the work.

Further, the energization electrode is held in contact with the work at least until the solidification of the surface portion, against which the electrode is being abutted, is completed as the energization is interrupted; hence, the directive solidification from a base material side toward the surface side can be reliably performed and the number of internal blow holes can be reduced.

Prior to the electric heating, a porous metal constituent different from the constituent of a work is cast in the surface portion of the work against which the electrode is to be abutted, and the work and the porous metal constituent are alloyed together by electric heating. This enables uniform and easy alloying to the work even when an element having high electric conductivity is used.

The work is electrically heated while applying a surface pressure of 14.7 MPa or less thereto by the energization electrode. This makes it possible to increase the treatment depth and also to shorten required treatment time.

The temperature of the distal end portion of the energization electrode reaches the melting point of the constituent of the work or higher, so that remelting or alloying treatment can be positively performed.

The distal end of the energization electrode is provided with restricting portions for suppressing the melted constituent of the work from running into a recession or through holes formed around the surface portion of the work, against which the electrode is to be abutted, during electric heating. This restrains the deterioration in the quality of the surface portion of the work that comes in contact with the electrode, and of the recession or the through holes.

Use of an aluminum alloy constituent for the work permits further effective application.

The heating efficiency of the work can be improved by providing a separate intermediate electrode between the energization electrode and the main body electrode provided at the proximal end of the energization electrode. In the intermediate electrode, the area of a section nearly parallel to the surface of the work, against which the electrode is to be abutted, is equal to or not less than that of the energization electrode. Further, the electric conductivity of the intermediate electrode is equal to or not more than that of the energization electrode.

Composing the energization electrode by a carbon constituent permits reliable and effective surface treatment.

The energization electrode is formed such that the area of the section thereof nearly parallel to the surface portion of the work, against which the electrode is to be abutted, is smaller than the distal end of the electrode. This ensures good localized heating of a surface area to be treated of the work.

The cost of machining before and after surface treatment can be reduced by forming before electric heating is started the surface portion of the work, against which the electrode is to be abutted, so that it projects from its surrounding surface.

Further, the energization electrode and the work are brought nearly in point contact before electric heating is begun, and the area of contact therebetween is increased while applying pressure to the work by the energization electrode at the time of the electric heating to deform the surface portion of the work against which the electrode is being abutted. This makes it possible to obviate the need of pre-machining such as smoothing the surface of the work against which the electrode is to be abutted and also to prevent sparks from being generated and the energization electrode from cracking.

The thermal stress of the energization electrode can be reduced to prevent cracks by preheating the energization electrode before electric heating is begun.

A receiving jig made of a carbon constituent is provided for the work on the opposite side from the energization electrode so that it is abutted against a work, and the area of the contact between the receiving jig and the work is made larger than the area of the contact between the energization electrode and the work. Thus, when electric current is supplied to the energization electrode and the receiving jig, the heat input to the work can be increased while preventing, at the same time, the side of the work facing the receiving jig from melting.

Furthermore, according to the electric heating treatment method or apparatus in accordance with the present invention, the surface portion of the work against which the electrode is abutted is locally heated to the melting point thereof or higher by both the heat generated from the self resistance of the energization electrode itself and the heat generated by the contact resistance at the interface between the distal end of the energization electrode and the work by supplying current to the energization electrode and the work, with the distal end of the energization electrode being held nearly in close contact with the surface of the work. This makes it possible to remelt the surface portion of the work, against which the electrode is abutted, or to alloy the work and a constituent different from that of the work. Further, the energization electrode is held in contact with the work at least until the solidification of the surface portion against which the electrode is abutted is completed as the energization is interrupted, allowing quality remelting or alloying treatment to be accomplished easily.

As many apparently widely different embodiments of the present invention can be made without departing from the spirit and scope thereof, it is to be understood that the invention is not limited to the specific embodiments thereof except as defined in the claims.

What is claimed is:

1. An electric heating treatment method for providing a surface portion of a work made by casting such that the surface portion abutted to an energization electrode achieves a directive solidification so that the surface portion is re-melted to include finer grains than the other portion not heat treated with predetermined heat surface treatment said method including the steps of;

providing a work made by casting to be heat treated;

abutting the energization electrode to said surface portion of the work made by casting;

supplying electric current between the energization electrode and said work while maintaining a distal end portion of energization electrode nearly in close contact with said surface portion so as to carry out electric heating by heat generated from self resistance of the energization electrode itself, wherein said energization electrode is held in close contact with said work until directive solidification of said surface portion is completed after said electric heating is stopped;

re-melting said surface portion, wherein electric current is supplied such that a temperature of a distal end portion of said energization electrode reaches a melting point of a constituent of said work or higher; and solidifying said surface portion so that said surface portion becomes finer than the other portion not heat treated thereby achieving said directive solidification.

2. An electric heating treatment method according to claim 1, wherein said predetermined surface treatment includes either or both of remelting treatment for remelting said work or alloying treatment for alloying said work and a constituent different from that of said work.

3. An electric heating treatment method according to claim 2, wherein:

a porous metal member composed of a material different from that of said work is cast in said surface portion prior to said electric heating; and alloying treatment is effected by alloying said work and said porous metal member by said electric heating.

4. An electric heating treatment method according to claim 2, wherein:

said electric heating is carried out while applying pressure to said work with a surface pressure of 14.7 MPa or less by said energization electrode.

5. An electric heating treatment method according to claim 1, wherein:

said work has a recession or a through hole at least in a part of an area around said surface portion; and the distal end portion of said energization electrode has a restricting portion for restricting a melted part of said work from flowing into said recession or said through hole at the time of said electric heating.

6. An electric heating treatment method according to claim 5, wherein:

said work is formed of an aluminum alloy constituent.

7. An electric heating treatment method according to claim 2, wherein:

before said electric heating, a separate intermediate electrode is provided between said energization electrode and a main body electrode provided at the proximal end of said energization electrode, an area of a section of said intermediate electrode which is defined on a surface nearly parallel to said surface portion being equal to or not less than that of said energization electrode, and electric conductivity thereof being equal to or not more than that of said energization electrode.

8. An electric heating treatment method according to claim 2, wherein:

said energization electrode is formed of a carbon constituent.

9. An electric heating treatment method according to claim 8, wherein:

said energization electrode is formed by press-fitting or shrink-fitting a carbon member into a tungsten pipe to combine them before said electric heating.

10. An electric heating treatment method according to claim 1, wherein:

said energization electrode has a portion, a sectional area of which is smaller than the distal end portion of said energization electrode, said sectional area being defined on a surface nearly parallel to said surface portion of said work.

11. An electric heating treatment method according to claim 1, wherein:

said surface portion of said work is formed so that it projects from a surrounding surface thereof before said electric heating.

12. An electric heating treatment method according to claim 11, wherein:

said energization electrode and said work are brought nearly in point contact before said electric heating; and said surface portion is deformed by applying pressure to said work by said energization electrode at the time of said electric heating, thereby increasing an area of the contact between said energization electrode and said work.

13. An electric heating treatment method according to claim 1, wherein:

said energization electrode is preheated before said electric heating.

14. An electric heating treatment method according to claim 2, wherein:

a receiving jig made of a carbon constituent is provided for said work on an opposite side from said energization electrode before said electric heating in a manner that it is abutted against said work; and electric current is supplied between said energization electrode and said receiving jig, with an area of the contact between said receiving jig and said work being made larger than an area of the contact between said energization electrode and said work.

15. An electric heating treatment method for providing a surface portion of a work made by casting such that the surface portion abutted to energization electrode achieves a directive solidification so that the surface portion is re-melted to include finer grains than the other portion not heat treated with predetermined heat surface treatment, said method including the steps of;

providing a work made by casting to be heat treated;

abutting the energization electrode to said surface portion of the work made by casting;

supplying electric current between the energization electrode and said work while maintaining a distal end portion of the energization electrode nearly in close contact with said surface portion so as to carry out electric heating by heat generated from self resistance of the energization electrode itself, wherein said energization electrode is held in close contact with said work until directive solidification of said surface portion is completed after said electric heating is stopped;

pre-machining said surface portion before re-melt to smooth said surface portion by removing the pits and projections of said portion;

remelting said surface portion, wherein electric current is supplied such that a temperature of a distal end portion of said energization electrode reaches a melting point of a constituent of said work or higher;

solidifying said surface portion so that said surface portion becomes finer than the other portion not heat treated; and finish machining said surface portion to eliminate the dents from said surface portion after solidifying.

16. An electric heating treatment method according to claim 15, wherein said work is a cylinder head and said surface portion is the top of the surface where inter-valve sections are provided.

17. An electric healing treatment method for providing a surface portion of a cylinder head made by casting where inter-valve sections achieve a directive solidification with predetermined heat surface treatment, said method comprising the steps of;

providing a work made by casting to be heat treated;

supplying electric current between an energization electrode and said cylinder head while maintaining a distal end portion of said energization electrode nearly in close contact with said surface portion, wherein said energization electrode is held in close contact with said work until directive solidification of said surface portion is completed after said electric heating is stopped; and carrying out electric heating by heat generated from self resistance of the energization electrode itself and heat generated from contact resistance at an interface between the distal end portion of the energization electrode and said surface portion, thereby re-melting said surface portion or alloying said cylinder head and a constituent different from that of said cylinder head;

said energization electrode being held in abutment against said cylinder head at least until a solidification of said surface portion is completed as said electric heating is stopped;

wherein the electric current is supplied such that a temperature of the distal end portion of the energization electrode reaches a melting point of a constituent of said cylinder head or higher to solidification or alloy said cylinder head such that said surface portion includes finer grains than the other portion not heat treated, thus achieving said directive solidification.

* * * * *